United States Patent
Khatwa et al.

(10) Patent No.: US 10,459,078 B2
(45) Date of Patent: Oct. 29, 2019

(54) RELIABILITY INDEX FOR WEATHER INFORMATION

(71) Applicant: Honeywell International Inc., Morris Plains, NJ (US)

(72) Inventors: Ratan Khatwa, Sammamish, WA (US); Zdenek Eichler, Olomouc (CZ); Jan Bilek, Lovcicky (CZ)

(73) Assignee: Honeywell International Inc., Morris Plains, NJ (US)

( * ) Notice: Subject to any disclaimer, the term of this patent is extended or adjusted under 35 U.S.C. 154(b) by 241 days.

(21) Appl. No.: 15/689,756

(22) Filed: Aug. 29, 2017

(65) Prior Publication Data
US 2018/0074189 A1 Mar. 15, 2018

Related U.S. Application Data

(60) Provisional application No. 62/394,108, filed on Sep. 13, 2016.

(51) Int. Cl.
*G01S 13/87* (2006.01)
*G01S 7/00* (2006.01)
(Continued)

(52) U.S. Cl.
CPC .......... *G01S 13/87* (2013.01); *G01C 21/3691* (2013.01); *G01C 23/005* (2013.01);
(Continued)

(58) Field of Classification Search
CPC ........ G01S 13/87; G01S 13/953; G01S 7/062; G01S 7/003; G06K 9/00; G06K 9/6288;
(Continued)

(56) References Cited

U.S. PATENT DOCUMENTS 6,289,277 B1 9/2001 Feyereisen et al.
6,441,773 B1 8/2002 Kelly et al.
(Continued)

FOREIGN PATENT DOCUMENTS

EP 2246715 A2 11/2010
EP 2937848 A1 10/2015
WO 2003025507 A2 3/2003

OTHER PUBLICATIONS

Extended European Search Report from counterpart European Patent Application No. 17190463.4, dated Jan. 12, 2018, 10 pp.
(Continued)

*Primary Examiner* — Jason Holloway
(74) *Attorney, Agent, or Firm* — Shumaker & Sieffert, P.A.

(57) ABSTRACT

In some examples, a system is configured to determine a reliability index for weather information received by a weather system. The reliability index may indicate a degree of confidence of the accuracy of the weather information. For example, a system may determine a weather product for each of one or more voxels of a plurality of voxels in a three-dimensional or four-dimensional volumetric buffer, and based on a combination of the weather product and the weather information, determine a reliability index for the weather product. The system may display a first visual representation of the weather product and a second visual representation of the corresponding reliability index.

18 Claims, 11 Drawing Sheets

(51) Int. Cl.

| | |
|---|---|
| *G01S 13/95* | (2006.01) |
| *G01W 1/02* | (2006.01) |
| *G08G 5/00* | (2006.01) |
| *G01C 21/36* | (2006.01) |
| *G01C 23/00* | (2006.01) |
| *G01W 1/00* | (2006.01) |
| *G01W 1/10* | (2006.01) |
| *G01S 7/06* | (2006.01) |

(52) U.S. Cl.
CPC ............ *G01S 7/003* (2013.01); *G01S 13/953* (2013.01); *G01W 1/00* (2013.01); *G01W 1/02* (2013.01); *G01W 1/10* (2013.01); *G08G 5/0013* (2013.01); *G01S 7/062* (2013.01); *G01W 2001/006* (2013.01); *G08G 5/0091* (2013.01); *Y02A 90/18* (2018.01)

(58) Field of Classification Search
CPC ..... G08G 5/0013; G08G 5/0091; G01W 1/00; G01W 1/10; G01W 1/02; G01W 2001/006; G01C 21/3691; G01C 23/005; Y02A 90/18
See application file for complete search history.

(56) References Cited

U.S. PATENT DOCUMENTS

| | | | |
|---|---|---|---|
| 6,614,383 B1 | 9/2003 | Cannaday, Jr. | |
| 6,683,609 B1* | 1/2004 | Baron, Sr. ............... | G01W 1/10 345/419 |
| 7,427,943 B1 | 9/2008 | Kronfeld et al. | |
| 7,492,305 B1 | 2/2009 | Woodell et al. | |
| 7,633,428 B1 | 12/2009 | McCusker et al. | |
| 7,667,621 B2 | 2/2010 | Dias et al. | |
| 7,714,767 B1 | 5/2010 | Kronfeld et al. | |
| 8,054,214 B2 | 11/2011 | Bunch | |
| 8,068,050 B2 | 11/2011 | Christianson | |
| 8,244,418 B1* | 8/2012 | Frank .................... | G01C 23/00 701/14 |
| 9,221,548 B1 | 12/2015 | Sishtla et al. | |
| 9,223,020 B1 | 12/2015 | Crosmer et al. | |
| 9,244,167 B1 | 1/2016 | Oransky et al. | |
| 9,719,785 B2 | 8/2017 | Vasek et al. | |
| 2003/0093219 A1* | 5/2003 | Schultz ................ | G05D 1/0005 701/533 |
| 2009/0177343 A1 | 7/2009 | Bunch et al. | |
| 2010/0245164 A1* | 9/2010 | Kauffman .................. | G01S 7/22 342/26 B |
| 2010/0245165 A1* | 9/2010 | Kauffman .............. | G01S 13/953 342/26 B |
| 2010/0271239 A1* | 10/2010 | Kolcarek ................ | G01W 1/00 340/971 |
| 2014/0358441 A1 | 12/2014 | Hale et al. | |
| 2016/0011334 A1 | 1/2016 | Khatwa et al. | |
| 2016/0092615 A1 | 3/2016 | Stenneth et al. | |
| 2016/0266249 A1 | 9/2016 | Kauffman et al. | |
| 2018/0031698 A1* | 2/2018 | Wang .................... | G01S 13/953 |
| 2018/0047294 A1* | 2/2018 | Esposito .............. | G08G 5/0008 |
| 2018/0149745 A1* | 5/2018 | Christianson ........... | G01S 7/003 |

OTHER PUBLICATIONS

"Crowd Sourced and 3D Aircraft Weather Radar Technology," Avionics, accessed on Nov. 29, 2016, accessed from http://interactive.avionicstoday.com/crow-sourced-and-3d-aircraft-weather-radar-technology, 38 pp.

"Crowd Sourced and 3D Aircraft Weather Radar Technology," Avionics, accessed on Sep. 26, 2016, accessed from http://interactive.avionicstoday.com/crow-sourced-and-3d-aircraft-weather-radar-technology, 35 pp.

Kronfeld, "Flight Deck Weather Information: Current and Future," Rockwell Collins, Oct. 18-19, 2015, 10 slides.

Schaffner, et al., "Benefits of Sharing Information from Commercial Airborne Forward-Looking Sensors in the Next Generation Air Transportation System," American Institute of Aeronautics and Astronautics, Jun. 2012, 8 pp.

"Weather Matters," Avionics content from ATW Online, accessed on Sep. 26, 2016, accessed from http://atwonline.com/avionics/weather-matters, 4 pp.

Lefevre, et al., "Weather Forecast Uncertainty Management and Display," P2.30, Jan. 2005, 5 pp.

"Aerospace Recommended Practice," SAE International, ARP 5740, Issued Jan. 2015, 44 pp.

"Minimum Aviation System Performance Standards (MASPS) for Flight Information Services-Broadcast (FIS-B) Data Link," Revision A, RTCA/DO-267A, Apr. 29, 2004, 142 pp.

Notice of Intent to Grant and Text Intended to Grant from counterpart European Application No. 17190463.4, dated Jan. 17, 2019, 61 pp.

Response to Extended European Search Report dated Mar. 19, 2018, from counterpart European Patent Application No. 17190463.4, filed on Sep. 14, 2018, 19 pp.

* cited by examiner

RELIABILITY INDEX FOR WEATHER INFORMATION

This application claims the benefit of U.S. Provisional Application No. 62/394,108, filed Sep. 13, 2016 and entitled "THREAT LEVEL DISPLAY FOR WEATHER INFORMATION," the entire content of which is incorporated herein by reference.

TECHNICAL FIELD

The disclosure relates to aircraft weather devices, systems, and methods.

BACKGROUND

In some cases, a weather system of an aircraft includes a display that provides a visual indication of weather conditions proximate to the aircraft or the planned flight trajectory. The weather system can determine the weather based on information from, for example, a weather radar system onboard the aircraft; other sensors onboard, e.g. a lighting detector or an ambient air temperature sensor; or from information obtained from outside of the aircraft, e.g. data from ground-based weather radar obtained through a datalink or broadcasted weather information.

SUMMARY

The disclosure describes example devices, systems, and techniques for generating and presenting a reliability index for weather information received by a weather detection system, such as a ground-based weather detection system or an onboard weather system of a vehicle (e.g., an aircraft or a marine vessel). A reliability index may indicate a degree of confidence in an accuracy of a weather product detected based on the received weather information or a likelihood that a depiction of a characteristic of the weather product on a display is accurate. The characteristic of the weather product can include, for example, at least one of an intensity, a size, or a threat level depicted for the weather product. A weather product may be, for example, weather information describing weather properties, such as a weather phenomenon, such as a storm cell or another type of weather cell.

In some examples, for one or more voxels of a plurality of voxels in a three-dimensional (3D) or a four-dimensional (4D) volumetric buffer, a system determines a weather product for the respective voxel. Based on a combination of the weather product and characteristics of the weather information (e.g., the age of the weather information, the source of the weather information, and the like), the system may determine a reliability index for the weather product. The system may then display a first visual representation of the weather product and a second visual representation of the corresponding reliability index. The reliability index may indicate a degree of confidence in the accuracy of the outputted visual representation of the weather products corresponding to the one or more voxels. For example, if the visual representation of a weather product shows certain reflectivity values in the weather product, then the reliability index may indicate a confidence that the shown reflectivity values are accurate with regards to the current state of the weather product. In some examples, the weather system may also use the received weather information to determine a threat level for at least one voxel in the 3D or 4D volumetric buffer (referred to herein generally as a "volumetric buffer"), the reliability index indicating a confidence in the determined threat level.

In one aspect, the disclosure is directed to a method comprising receiving, by a processor on an aircraft, weather information; and, for at least one voxel of a plurality of voxels of a volumetric buffer: determining, by the processor and based at least in part on the weather information, a weather product for the respective voxel; determining, by the processor and based at least in part on the weather product and the received weather information, a reliability index for the weather product, the reliability index indicating a degree of confidence that one or more characteristics of the weather product are accurate; and outputting, by the processor and for display at a display device, a first visual representation of the weather product and a second visual representation of the reliability index for the weather product.

In another aspect, the disclosure is directed to a system comprising a display device; and a processor configured to: receive weather information, and, for at least one voxel of a plurality of voxels of a volumetric buffer: determine, based at least in part on the weather information, a weather product for the respective voxel, determine, based at least in part on the weather product and the received weather information, a reliability index for the weather product, the reliability index indicating a degree of confidence that one or more characteristics of the weather product are accurate, and output, for display at the display device, a first visual representation of the weather product and a second visual representation of the reliability index for the weather product.

In another aspect, the disclosure is directed to a non-transitory computer-readable medium including instructions that, when executed by a processor, cause the processor to receive weather information, and, for at least one voxel of a plurality of voxels of a volumetric buffer: determine, based at least in part on the weather information, a weather product for the respective voxel, determine, based at least in part on the weather product and the received weather information, a reliability index for the weather product, the reliability index indicating a degree of confidence that one or more characteristics of the weather product are accurate, and output, for display at a display device, a first visual representation of the weather product and a second visual representation of the reliability index for the weather product.

In another aspect, the disclosure is directed to an apparatus on an aircraft, the apparatus comprising means for receiving weather information; and, for at least one voxel of a plurality of voxels of a volumetric buffer: means for determining, based at least in part on the weather information, a weather product for the respective voxel; means for determining, based at least in part on the weather product and the received weather information, a reliability index for the weather product, the reliability index indicating a degree of confidence that one or more characteristics of the weather product are accurate; and means for outputting, for display at a display device, a first visual representation of the weather product and a second visual representation of the reliability index for the weather product.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
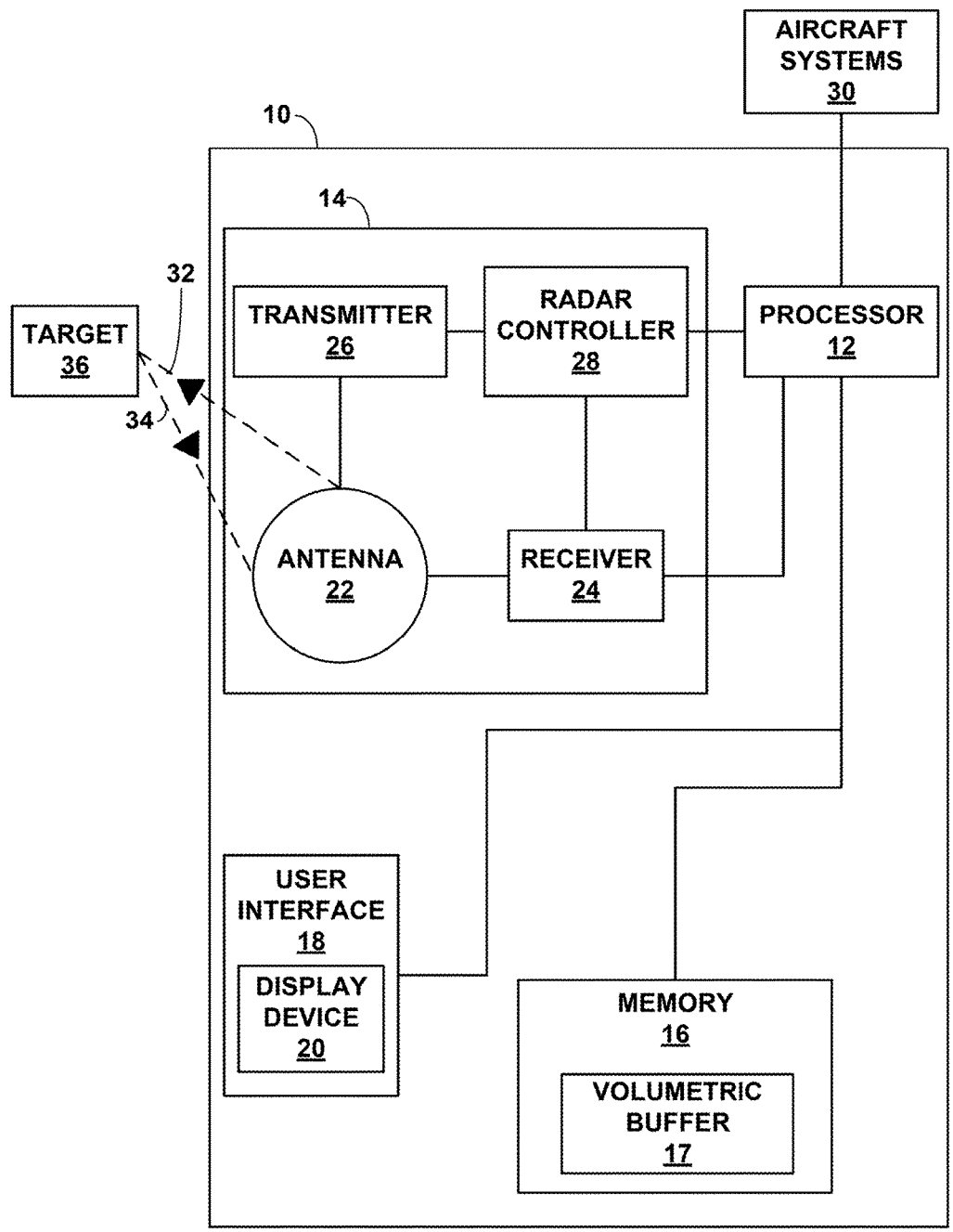
FIG. 1 is a block diagram illustrating details of an example aircraft weather system configured to display weather information for an aircraft.

In examples described herein, a system is configured determine a reliability index for a weather product detected based on received weather information. The weather product can be, for example, a type of weather phenomenon in a particular volume of airspace (e.g., as defined by a single voxel of a 3D or a 4D volumetric buffer or multiple voxels of the 3D or the 4D volumetric buffer), or any other description of a weather phenomenon in the particular volume of airspace. A reliability index may, for example, indicate a degree of confidence that one or more determined characteristics of the weather product, e.g., depicted by a graphical representation of the weather product in a display, are accurate with respect to actual characteristics of the weather phenomenon. In some examples, a system may determine one or more characteristics of a weather product, such as, but not limited to, a location of the weather product, a type of weather phenomenon described by the weather product, an intensity of the weather product, or a threat level of the weather product. The system may determine these characteristics based on weather information received from either a local weather system (e.g., onboard an aircraft or other vessel) or a remote weather system (e.g., a ground system remote from a vessel). However, some of the received weather information may be outdated, from a source that is relatively far away from a detected weather phenomenon, or from a source that is predicting the weather phenomenon relatively far into the future. As such, some of the received weather information may not be as reliable as weather information received from a more local, real-time radar system. The system may determine the reliability index to reflect this uncertainty, enabling a user to discern between displayed or otherwise detected weather products that are more likely accurate, and weather products that may be less accurate.

A weather product may span a volume of airspace, which may be represented by a 3D volumetric buffer or a 4D volumetric buffer. The 3D volumetric buffer may be a data structure that includes a 3D array of data objects, called voxels. The system may be configured to extract reflectivity information for an earth-referenced 3D area in the vicinity of the system and correlate the earth-referenced 3D area to the 3D array of voxels. The system may then store the reflectivity information, as well as any other weather information specific to a specific volume of airspace within the earth-referenced 3D area, to a corresponding voxel within the 3D volumetric buffer. The system may determine a weather product in a particular 3D area in the vicinity of the aircraft based on the weather information stored in the corresponding voxel, the weather products describing characteristics of various weather phenomena that may exist in the environment. Example weather phenomena include air turbulence, windshears, microbursts, volcanic ash, storms, rain, snow, hail, low-visibility areas, high-altitude ice crystals, or any other weather-related phenomena that may affect travel of a vessel (e.g., an aircraft or a marine vessel).

Example 3D volumetric buffers, example radar systems, or both, are described in U.S. Pat. No. 4,940,987 to Frederick, U.S. Pat. No. 5,202,690 to Frederick, U.S. Pat. No. 5,920,276 to Frederick, U.S. Pat. No. 6,667,710 to Cornell et al., U.S. Pat. No. 6,690,317 to Szeto et al., U.S. Pat. No. 6,707,415 to Christianson, U.S. Pat. No. 6,720,906 to Szeto et al., U.S. Pat. No. 8,111,186 to Bunch et al., and U.S. Pat. No. 8,289,202 to Christianson, the entire contents of which are incorporated herein by reference.

In a 4D volumetric buffer, each voxel, in addition to storing weather data associated with the earth-referenced 3D area, may store indications of time at which the weather information is received. In other words, the extra dimension of the 4D volumetric buffer may be time, such that the 4D volumetric buffer may store instances of the 3D volumetric buffers at various times. In accordance with the techniques described herein, the system may receive weather information from various sources that each create the respective weather information at different times. As such, by storing the weather information in a 4D volumetric buffer, the weather information for the 3D volumetric buffer may be stored with additional indications of timestamps and/or time validity. For example, for the same volume of space in an earth-referenced 3D area, the system may receive weather information that includes a pilot report at a first time, radar reflectivity information from a second time, a forecast for a third time, a forecast for a fourth time, and a forecast for a fifth time, where the first through fifth times are different (though they may overlap). A weather system described herein may store all of this information to the same voxel with indications of the time at which the weather information was generated or received. In other examples, however, rather than storing all of this information to the same voxel, the system may store this information in different voxels (each associated with the same volume of airspace, but different times) based on the times in addition to any differences of the earth-referenced 3D area.

Although aircraft are primarily referred to below throughout the description, in other examples, the devices, systems, and methods described herein may be used with or by another type of vehicle, such as a marine vessel.

In some examples, a system may generate and present a graphical user interface that includes a visual representation of both a reliability index and a corresponding weather product. The graphical user interface may be presented to, for example, a user inside an aircraft or a user outside the aircraft, such as on the ground (e.g., in a ground station). The system may be located in the aircraft, in another aircraft, or in another location, such as at a ground station. The graphical user interface may be referred to as a weather display and may present, for example, a graphical representation of an airspace and one or more graphical indications. A first graphical indication may indicate a weather product itself, including details describing the weather product (e.g., location, intensity, threat level, type of weather phenomenon described by the weather product, and the like). A second graphical indication may indicate a reliability index for the weather product, the reliability index indicating a degree of confidence that the one or more characteristics of a detected weather product depicted by the first graphical indication are accurate with respect to actual characteristics of the weather phenomenon in the environment in which the weather phenomenon exists. In some examples, the one or more graphical indications can be positioned within the representation of the airspace to indicate the location of the part of the airspace to which the particular reliability index and the weather product applies. The location can be, for example, earth referenced or referenced relative to another reference point, such as an aircraft.

The system may determine the reliability index based on a number of factors that may affect the accuracy of the received weather information. Example factors include, but are not limited to, the source of the weather information, a number of sources reporting a particular weather product or phenomenon, a distance of the source from the weather products, an amount of time that has elapsed since the weather information was generated by or received from the source of the weather information, a time elapsed since a user observation of the weather product or phenomenon from a vessel that contains the source of the weather information, a trend based on a sequence of the weather information (e.g., a movement trend or a generation/dissipation trend based on time), or a mutual interaction that may occur between two or more types of weather products.

In some examples, a system may place a higher confidence, resulting in a higher reliability index value, on weather information more recently received from an onboard radar system compared to weather information received from a ground-based radar system a longer amount of time prior to the current time (e.g., weather information received as a forecast from a ground-based radar system some period of time, such as an hour, prior to the aircraft taking flight). As another example, a system may place a higher confidence in weather information generated by an airborne aircraft in the vicinity of the aircraft for which the system is generating the weather display than in weather information received from ground-based radar system.

A number of sources that report the same weather phenomenon may also affect the confidence in the detection of the same weather product. A system may, for example, place a higher confidence, indicating a higher reliability index value, in a detection of a weather product or particular characteristics of the weather product (e.g., a threat level) when multiple (e.g., two or more or three or more) sources provide weather information to the system indicating the presence of the weather product or substantially the same (the same or effectively the same) characteristics of the weather product. In this way, a system may increase a reliability index in response to determining that a detected weather product is confirmed by another weather source.

When a greater or a fewer number of weather sources provide weather information indicating (e.g., predicting or reporting) the same weather phenomenon, the reliability index may be increased or decreased, respectively. For instance, if a system determines based on received weather information that weather information clear air turbulence (CAT) is forecasted in a given volume of airspace and if pilot reports (PIREPs) also report turbulence is present in the same area, then the system may assign the detected CAT a relatively high reliability index value.

Additionally, the distance of the source of the weather information from the detected weather products may affect the reliability index. For instance, the reliability of weather information may decrease as the distance of the source from the weather phenomena increases, as radar returns may generally become weaker when the distance the waves must traverse increases. Further, for systems that generate forecasts, the reliability of such forecasts may decrease as the distance from the weather phenomena increases.

In some examples, the amount of time that has elapsed since the weather information was generated by or received from the source of the weather information may affect the reliability index of the weather information. For instance, if the system received a forecast from a ground-based weather radar system for a particular volume of airspace within minutes of encountering the area for which the forecast is predicting the weather, then the system may place a relatively high reliability index value on the forecast. However, if it will take the system multiple hours to reach the area for which the forecast is predicting the weather, then the system may place a relatively low reliability index value on the forecast, as the nature of weather is dynamic and can be difficult to predict far into the future.

Further, the amount of time that has elapsed since a user observation of the weather product from a vessel that contains the source of the weather information may affect the reliability index of the weather information. For instance, one source of weather information may be observations from a pilot of another vessel that, in the past, travelled through the same area that the system is planning to pass through in the future. If the vessel passed through the area relatively recently (e.g., within one hour or less, although other time parameters may be used in other examples), then the system may place a relatively high reliability index value on the received observation. However, if the vessel passed through the area less recently (e.g., multiple hours ago), then the system may place a relatively low reliability index value on the received observation. Thus, the system may apply a threshold amount of time to determine the reliability index value for a weather product.

In some examples, the presence of some weather phenomena may increase or decrease the probability of presence of another weather phenomenon, such that the known or expected mutual interactions between two or more types of weather phenomena may be used to determine the accuracy of determined weather products. For example, a system may store a rule that indicates that icing may not be present without clouds, such that if icing is detected without the presence of a certain level of cloud cover, then the system may place a relatively low reliability index value on the received observation.

By determining a reliability index and outputting a visual representation of the reliability index for a weather product or for a particular voxel representative of a particular volume of airspace, the system may provide a user with a better understanding of the displayed weather. Weather products, including all types of weather, e.g., from storm cells or turbulent weather cells to clear skies not having any adverse weather, may dynamically change over time, such that weather information may become outdated or less useful relatively quickly. A weather display including a reliability index for a displayed weather product or a particular voxel may enable a user (e.g., a pilot of an aircraft) to discern, from the weather display, which weather product representations may be outdated and which weather products may be more reasonably relied upon.

The inclusion of the reliability index in a weather display may be additionally useful in systems that receive weather information for the same volume of space from multiple, diverse sources at various times and having various levels of reliability. In some situations, a weather system, e.g., onboard on a vehicle, such as an aircraft or a marine vessel, or on the ground, may receive weather information from multiple possible sources. A first example source of weather information may be a significant weather (WX) chart, or an aggregation of all weather information which may have significant impact on flight (e.g., severe icing and turbulence), which may be part of pre-flight briefing. The significant weather chart may not be up-to date, time and spatial resolution may be low, and the chart may not provide detailed information about less significant, but still relevant weather phenomena.

A second example source of weather information may be an uplink weather application, which may provide up-to-date weather with relatively high temporal, spatial, and intensity resolution, and may be available worldwide. A limitation of this system may be that it presents raw radar data for a particular weather product, so it may not provide an aggregated view of all significant weather phenomena at one time like a significant weather chart does. Also, the weather information provided by the uplink weather application may be relatively old. The uplink weather application may provide global coverage and be a strategic resource for longer-term decisions.

A third example source of weather information may be an onboard weather radar system (e.g., an airborne weather radar in the case of an aircraft), which may be configured to detect storm cells or other inclement weather along a flight path (or travel path in the case of a marine vessel) and present a view of the inclement weather to the pilot or flight crew, so that the pilot may be able to avoid these areas of storms or other inclement weather. A limitation of this system may be that its coverage is only local, which can significantly decrease the value of this source of weather for strategic planning. Further, only convective related phenomena may be detectable by an onboard weather radar system, thus other types of weather phenomena, such as clear air turbulence (CAT), may not be detected. Onboard weather radar systems may be a tactical resource for short-term decisions.

Currently, pilots or other users may work with two or more of these sources of weather information or multiple types of other sources of weather information, mentally merge the weather information received from the sources together, and then determine the current weather conditions for the aircraft based on the pilot's understanding of the weather information. Rather than display graphical indications of weather products such that, without closer inspection regarding the source of the weather information, the pilot may believe that each weather product is exactly as depicted, by determining the reliability index for the weather product, the system generates the graphical indications such that the pilot can quickly ascertain whether a graphical indication of a weather product depicts the weather product as it is likely to exist in the natural environment or whether the pilot should expect the characteristics of the weather product (e.g., the location of the weather product, the intensity of the weather product, the type of the weather phenomenon described by the weather product, or a threat level of the weather product, for instance) to be different than what is depicted on the navigation display.

Different weather information sources and even particular weather products may work with different time validity, or a time at which the received weather information may no longer be considered valid and accurate. For example, airborne radar may provide real-time weather information, but an uplink weather service may provide older strategic information. Further, different types of uplinked weather products may have different issue time and validity (e.g., from 20 minutes to 3 hours). As such, more mental workload may be placed on the pilot to filter through all of this information. In addition, different weather information sources may have different geographical coverage. Pilots may use uplink weather applications to virtually extend coverage of onboard radar with less reliable data, but mentally merging these different data from two different displays can be demanding and time consuming. Uplink weather today on integrated navigation (INAV) displays could show up to four weather products, for example CAT, icing, composite radar, and winds aloft. For pilots, it may be difficult to correctly interpret some attributes of weather products, e.g., the probability of the forecast being correct.

Pilots or other users may also review weather information from multiple sources, mentally merge the weather information together, and then evaluate the combined weather information to make any necessary vehicle operational decisions. Further, in some cases, weather observations and forecasts received via uplink are presented in "raw form" (e.g., reflectivity level, winds speeds, icing coverage, and the like) and the actual significance of the weather information for a particular operational scenario may require manual pilot interpretation and judgement. The evaluation of weather information in an ad hoc manner can at times be challenging because the impact of some weather phenomena is not given by a phenomenon itself, but may be indicated by other factors, e.g., the current state of aircraft systems (e.g., the status of a de-icing system, such as the availability of a deicing system on the aircraft for which the weather display is being generated) which may vary during flight. Further, in some cases, the impact of weather phenomena on a flight of a particular aircraft can also a function of the type of operations and crew training of the aircraft. For example, low cloud ceilings (e.g., thick clouds present at low altitudes that may affect visibility) and other causes of low visibility may not pose a severe threat to the operations of commercial aviation airliners, but may present a serious threat to general aviation aircraft that may need to fly in visual conditions (e.g., due to lack of equipment or crew training). An aircraft equipped with a category IIIb instrument landing system (ILS) (or another similar approach system) and appropriately trained crew may require less than 50 feet of height (about 15 meters) for visual reference, such that a low ceiling may not be an issue. On the other hand, a less equipped business jet with only a category I ILS may require a longer visual reference, such as a visual reference of at least 200 feet (about 61 meters).

For at least the above-mentioned reasons, it may not be beneficial to simply assign threat coding colors to weather products. The threat coding can, for example, indicate the relative hazard level of detected weather phenomena (e.g., turbulent air being assigned a higher hazard level than clear skies). The example weather displays described herein, which may present a reliability index (and, on some examples, reasoning of for the reliability index) for a detected weather product may help a pilot or other user more quickly gain a better understanding of displayed weather and better understand the threat level of the weather product or group of weather products.

In some examples described herein, a system may combine weather information received from multiple sources to create a single display of weather information. In combining the weather information, the system may use the reliability index as a weight for the respective weather information received from a particular source, with the system favoring the weather information with a higher reliability index rather than weather information with a lower reliability index. In some examples, the system may further utilize aircraft systems status information for the aircraft or aircraft state data for the aircraft to determine a threat level of the combined weather information and display an additional visual representation of the threat level for the particular weather product.

In some examples of this disclosure, the system may determine respective reliability indices for the weather information received from each of the various sources, enabling the system to provide context to the pilot for each piece of information presented to the user rather than simply displaying the weather products themselves. Example weather displays described herein that include one or more indications of respective volumes of airspace to which particular threat levels may apply may help a user more quickly ascertain which volumes of airspace may pose a potential for adverse flight conditions, particularly when compared to a weather display that does not distinguish threat levels for various volumes of airspace using multiple sources of weather information and aircraft information (e.g., an aircraft systems status, a training level of a crew on the aircraft, and aircraft state data).

In some examples, the aircraft systems status for an aircraft may include engine information (e.g., the type of engine, the number of engines, and the like), the availability of a de-icing system for use during the flight, the availability of an instrument landing system (ILS) for use during the flight, or any other statuses regarding mechanical information about the specific aircraft containing a weather system configured to perform the techniques described herein. In some examples, the aircraft state data for the aircraft may include a position of the aircraft, an airspeed of the aircraft, an altitude of the aircraft, a track of the aircraft, a pitch of the aircraft, a flight path angle, a heading of the aircraft, a roll angle, a yaw angle, or any other piece of data that could be used to describe state data for the aircraft.

In some examples, a processor is configured to determine a threat level for a particular weather product based on known crew training limitations and/or types of operations. For instance, low ceiling and visibility may pose a higher threat to aircraft which may need to fly in visual conditions (due to equipment or crew training limitations) compared to commercial aviation operations and properly trained crew for category III ILS approaches.

The display, as described throughout this disclosure, may depict a representation of airspace in the vicinity of the system or in a predicted travel path of a vessel that contains the system. This representation of airspace can be, for example, a plan view, a vertical profile view (also referred to as a vertical situational display or a vertical profile display) showing a particular lateral distance range (e.g., relative to the aircraft), or a 3D view of the airspace. While "volume of airspace" is primarily referred to herein to indicate a part of an airspace, the weather displays described herein may present a 2D indication (e.g., view) of the volume or a 3D indication of the volume. Example 2D views include, for example, a lateral or vertical cross-sectional view, a view of the weather at a plurality of altitudes from the lateral perspective (e.g., a projected view), or a view of the weather at a plurality of lateral positions from a vertical perspective (e.g., a projected view).

For example, a plan view display presents a plan view (e.g., a cross-section) of a volume of airspace and illustrates a lateral view of weather, the lateral distance being measured substantially perpendicular to a vertical direction, in which altitude is measured. Thus, the plan view may illustrate a lateral extent of airspace at one or more altitudes. In some examples, the plan view shows a cross-section (or "slice") of a volume of airspace in the lateral direction. In addition, in examples, the plan view illustrates a consolidated view of weather at a plurality of altitudes (e.g., all altitudes). In contrast, a vertical profile display represents a vertical view of a volume of airspace (e.g., a cross-section or "slice" in a vertical direction), and illustrates a plurality of altitudes. A 3D view display may represent a perspective view of a volume of airspace, and, therefore, may show three dimensions of the volume of airspace. In some examples, in either the plan view display or the 3D view display, a user may interact with the system presenting the display to change an azimuth of the display, e.g., to view the detected weather from a different perspective.

In some examples, the indication of a part of an airspace to which a particular threat level may apply may include an outline of a volume of airspace, which may be displayed as an outline of a two-dimensional (2D) area (e.g., a cross-section of the volume) or a 3D volume. For example, the outline may be a 2D outline of the lateral extent of detected weather conditions (e.g., shown in the plan view display), a 2D outline of the vertical extent of the weather conditions (e.g., shown in a vertical profile display), or a 3D outline of the volume of airspace in a 3D view (e.g., shown in a 3D display). In some examples, the displayed outline may enclose or substantially enclose the lateral extent, vertical extent, or both lateral and vertical extent of the volume of airspace to which a particular threat level may apply in the view shown. For example, in a plan view weather display, the outline may represent the border of the volume of airspace in the lateral slice of airspace shown in the plan view weather display. As another example, in a vertical profile display, the outline may represent the border of the volume of airspace in the vertical slice of airspace (or vertical slices of airspace in the case of an unwound vertical profile display) shown in the vertical profile view.

In examples described herein, an outline need not be shown in a continuous line, but, rather may be shown as any suitable graphical indication of the border of a part of an airspace that visually distinguishes that part of the airspace from a surrounding volume of airspace. However, in some examples, the outline is shown by a solid, continuous line.

FIG. 1 is a block diagram illustrating details of an example weather system 10 configured to display weather information for an aircraft. System 10 may be onboard an aircraft (also referred to as an "ownship") or another type of vehicle in some examples, and may be external to the aircraft in other examples. System 10 includes one or more processors (referred to herein as processor 12), weather radar system 14, memory 16, and user interface 18, which includes display device 20. Processor 12 may be electrically coupled to radar system 14, memory 16, and user interface

18. Processor 12 may also be configured to communicate with other various aircraft systems 30, which may include, for example, a flight management system (FMS), an air data computer (ADC), an Inertial Navigation System (INS), a Global Positioning System (GPS), or any combination thereof.

Processor 12, as well as other processors disclosed herein (including radar controller 28 discussed below), can comprise any suitable arrangement of hardware, software, firmware, or any combination thereof, to perform the techniques attributed to processor 12 herein. For example, processor 12 may include any one or more microprocessors, digital signal processors (DSPs), application specific integrated circuits (ASICs), field programmable gate arrays (FPGAs), or any other equivalent integrated or discrete logic circuitry, as well as any combinations of such components. Memory 16 includes any volatile or non-volatile media, such as a random access memory (RAM), read-only memory (ROM), non-volatile RAM (NVRAM), electrically erasable programmable ROM (EEPROM), flash memory, and the like. System 10 may include multiple types of memory. For simplicity, all memory of system 10 is shown in FIG. 1 collectively as memory 16. Memory 16 may store computer readable instructions that, when executed by processor 12, cause processor 12 to implement the techniques attributed to processor 12 herein.

User interface 18 includes display device 20, which can be, for example, one or more of a liquid crystal display (LCD) or a light emitting diode (LED) display configured to present visual information to the user. Display device 20 can be provided by any suitable device, such as, for example, one or more of a tablet computing device, an electronic flight bag (EFB), a primary flight display (PFD), a multifunction display (MFD), a navigation display, or any other suitable display. Display device 20 can be a head-up display, a head-down display, a head-mounted display, or any other type of suitable display.

In addition, in some examples, user interface 18 includes a speaker configured to deliver audible information, a sensory device configured to deliver information via a somatosensory alert, or any combination thereof. User interface 18 can be configured to receive input from a user in some examples. For example, user interface 18 can include one or more of a keypad, buttons, a peripheral pointing device, or another input mechanism that allows the user to provide input. The buttons may be dedicated to performing a certain function, e.g., receiving user input indicative of a specific type of input, or the buttons and the keypad may be soft keys that change in function depending upon the section of a display currently viewed by the user. In some examples, the display device of user interface 18 may be a touch screen display configured to receive the input from a user.

Processor 12 is configured to generate weather information based on signals received from various aircraft flight systems, such as based on radar reflectivity data from radar system 14, weather information received from another weather information source, such as a weather reporting service or another ground system, weather information received from other aircraft, or any combination thereof. Although not specifically shown in FIG. 1, aircraft systems 30 may include a communication system configured to receive weather information from one or more other weather information sources, such as, but not limited to, a weather reporting service, another aircraft, or both.

In the example shown in FIG. 1, radar system 14 includes antenna 22, receiver 24, transmitter 26, and radar controller 28. Under the control of radar controller 28, transmitter 26 is configured to generate and transmit radar signals 32 from antenna 22 into airspace proximate to the aircraft, and receiver 24 is configured to receive, via antenna 22, return signals (reflectivity values) if a target 36 is present to scatter energy back to the receiver. Target 36 can be, for example, a weather phenomenon, and the reflectivity data describing the weather phenomenon (from which weather product information may be generated) may correspond to that portion of the signal reflected back to the radar by liquids (e.g., rain) and/or frozen droplets (e.g., hail, sleet, and/or snow) residing in a weather object, such as a cloud or storm, or residing in areas proximate to the cloud or storm generating the liquids and/or frozen droplets. In some examples, radar controller 28 controls transmitter 26 and receiver 24 to send and receive signals 32, 34, respectively, via the antenna 22 based on aircraft data (e.g., position, heading, roll, yaw, pitch, flight path angle, and the like) received from aircraft systems 30.

In some examples, radar controller 28 digitizes the return signals 34 and sends the digitized signals to processor 12. Processor 12 may receive the radar returns data from radar system 14 and store the radar return data in memory 16. In some examples, processor 12 may translate the received return signals for storage in a 3D or 4D volumetric buffer 17 included as part of memory 16. For example, radar system 14 may be configured to scan the entire 3D space in front of the aircraft, and processor 12 may store all reflectivity data in an earth-referenced 3D (or "volumetric") memory buffer 17 (e.g., a 3D data structure). In some examples, processor 12 populates the 3D memory buffer 17 with radar returns for a range of 320 nautical miles and from a ground level to 60,000 feet above Mean Sea Level (MSL). However, 3D memory buffer 17 may store other ranges of radar returns in other examples. 3D memory buffer 17 may, for example, include an array of voxels, and the memory buffer may associate radar return values with respective voxels (3D volumetric pixels) of an airspace. The weather associated with each voxel may represent the average value of reflectivity in the volume of space represented by the voxel. Although volumetric buffer 17 is primarily referred to as a 3D volumetric buffer herein, in other examples, 3D volumetric buffer may be a 4D volumetric buffer in other examples.

Processor 12 may update the buffer with radar reflectivity data from new scans. In some examples, processor 12 updates the data in the buffer every 30 seconds, although other update frequencies can also be used. Processor 12 can then extract reflectivity data from the buffer to generate the desired weather information without having to make and wait for view-specific antenna scans. With the volumetric buffer data, the presentation of a weather display is not constrained to a single tilt-plane that is inherent to conventional radar. This volumetric memory buffer enables processor 12 to integrate weather returns on a vertical profile display, as described herein.

Processor 12 is configured to determine weather proximate to the aircraft based at least in part on the radar reflectivity data (also referred to herein as radar return data) provided by radar system 14. For example, processor 12 may identify the type of weather phenomenon indicated by the weather products proximate to the aircraft, such as rain/moisture, windshear, or turbulence based on the radar reflectivity data and a corresponding algorithmic interpretation of the reflectivity values. In some examples, processor 12 may implement techniques to discriminate between different types of weather using a Vertically Integrated Reflectivity (VIR) calculation. VIR data includes the sum of reflectivity values stored in a column of cells in the 3D buffer or an integration of the values in the column of cells is performed. Processor 12 may vertically integrate the product of reflectivity values and altitude, each raised to some power.

Processor 12 may also detect weather products proximate to the aircraft based on weather information received from other sources, such as ground-based radar systems, ground-based weather prediction systems, and other vessels traveling through or that have traveled through the environment currently proximate to the aircraft. For example, in addition to, or in place of, the weather information received from radar system 14, processor 12 may receive, via a communication circuitry in communication with sources outside of the aircraft, weather information from the sources outside of the aircraft. Processor 12 may analyze such information to determine weather products proximate to the aircraft.

In examples in which processor 12 receives weather information from one or more sources external to the ownship via communications circuitry of aircraft systems 30, processor 12 may store the received weather information in memory 16 (e.g., in 3D buffer 17) using any suitable technique.

For at least one voxel of a plurality of voxels of 3D or 4D volumetric buffer 17, processor 12 may be configured to determine, based at least in part on the weather information, a weather product for the respective voxel. Processor 12 may determine, based at least in part on the weather product and the received weather information, a reliability index for the weather product, the reliability index indicating a degree of confidence that one or more characteristics of the weather product (e.g., location, threat level, intensity, type, and the like) are accurate. Processor 12 may then be configured to output, via display device 20, a first visual representation of the weather product and a second visual representation of the reliability index for the weather product.

In some examples, to determine a reliability index, processor 12 may determine respective coefficients for at least one of a reliability of a source of the weather information, a distance of the source of the weather information from the weather product, a time elapsed since receiving the weather information from the source of the weather information, a time elapsed since a user observation of the weather product from a vessel that contains the source of the weather information, or a mutual interaction between the weather product and a second weather product to either compound or diminish the effects of the weather product. Processor 12 may then combine the respective coefficients to determine the reliability index. A more detailed description of this process is described below with respect to FIG. 2. In other examples, however, processor 12 may determine coefficients for only a subset of the aforementioned variables, or for a different set of variables.

In some instances, the weather information may include both first weather information and second weather information. Processor 12 may receive the first weather information, such as weather radar data, from a first source, such as onboard radar system 14 of the aircraft. Processor 12 may receive the second weather information from a second source different than the first source, such as a device external to the aircraft (e.g., a significant weather chart or weather information received from an uplink weather application). Processor 12 may combine the first weather information and the second weather information to determine combined weather information.

In some examples, to combine the first weather information and the second weather information, processor 12 may determine, based on the first weather information, radar intensity information associated with a first weather product in a 2D horizontal plane of a 3D region of airspace. Processor 12 may also determine, based on the second weather information, altitude data associated with a second weather product in the 3D region of airspace. Processor 12 may determine that the first weather product is located in a same area of the 3D region of airspace as the second weather product, and subsequently merge the first weather information for the first weather product with the second weather information of the second weather product to derive the combined weather information regarding the weather product.

In some examples in which processor 12 receives weather information from multiple sources, processor 12 may determine a first reliability index for the first weather information and determine a second reliability index for the second weather information. Furthermore, processor 12 may determine a weather product for the respective voxel of 3D buffer 17 based on the combined weather information, and may use any of the available information (e.g., the first weather information, the second weather information, the combined weather information, the first reliability index, the second reliability index, and the like) to determine a combined reliability index.

In some examples, processor 12 may also determine a threat level for a voxel in addition to the reliability index. For example, processor 12 may a threat level for a voxel of 3D buffer 17 based on the type of weather phenomenon described by the weather product associated with the voxel, aircraft systems status information of the aircraft, a status of a weather system (e.g., a weather radar or uplink weather system, and the like), a training level of an aircraft crew, and aircraft state data for the aircraft. Aircraft status system information can include, for example, one or more of: engine information, which may indicate the flight capabilities of the aircraft, a status (e.g., operational or not operational) of an onboard de-icing system, and a status (e.g., operational or not operational) of an approach system (e.g., an electronic approach system, such as, but not limited to, an ILS receiver, very high frequency (VHF) omnidirectional range (VOR), distance measuring equipment (DME), required navigation performance (RNP), global navigation satellite system (GNSS), and the like). Aircraft state data can include, for example, one or more of a position of the aircraft, an airspeed of the aircraft, an altitude of the aircraft, a track of the aircraft, a pitch of the aircraft, a heading of the aircraft, a flight path angle, a roll of the aircraft, an angle of the aircraft, a yaw angle of the aircraft, and the like. In some instances, the aircraft systems status information may be predetermined information entered prior to the beginning of the flight. In some instances, the aircraft systems status information may be determined or updated dynamically based on the current status of particular systems, such as updates to the engine status or the status of the de-icing system. Processor 12 may further output, for display at display device 20, weather display including a visual representation of the threat level for the respective voxel. In some examples, the reliability index may indicate a confidence level in the determined threat level for the respective voxel.

User interface 18 is configured to present, via display 20, weather information, e.g., the weather display generated by processor 12 including the indication of the reliability index, the indication of the weather products, and/or the indication of the threat levels in the at least on voxel of volumetric buffer 17, to a user, who may be a pilot of the aircraft, another flight crew member, or may be located remotely from the aircraft, such as at a ground control station.

In some examples, system 10 and processor 12 may use a processing engine (e.g., an expert system, a pattern recognition system, or a machine learning system), that may provide the function of weather data interpretation for the pilot. System 10 may determine a reliability index for each entry in a threat map for a particular aircraft in real-time, taking into account all available weather products and sources (e.g., uplink weather and onboard radar), a current flight plan, own-ship position, a current aircraft systems state data, or any subset of such information. A threat map may be, for example, a graphical depiction of a volume of airspace (e.g., the airspace proximate or non-proximate the ownship) that includes weather products detected in the volume of airspace, a respective threat level for one or more of the weather products, and a respective threat level for one or more of the weather products. System 10 may generate and display a weather display that includes a representation of an airspace, indications of one or more weather products, the corresponding reliability indices for each of one or more weather products, and, in some examples, a threat level of the one or more weather products, such that the pilot does not have to manually interpret the data. System 10 may include graphical indications of some or all weather products determined in the volumetric buffer, taking into account issue times of individual weather products, reliability of forecasts, and the like. In this way, the weather displays described herein may provide an integrated assessment of all the available weather products (or weather features) automatically instead of requiring the flight crew to interpret individual weather products in isolation. System 10 may further decrease the pilot's workload and decrease the risk of overlooking some significant weather phenomena for the prevailing weather conditions and planned flight plan.

Figure 2:
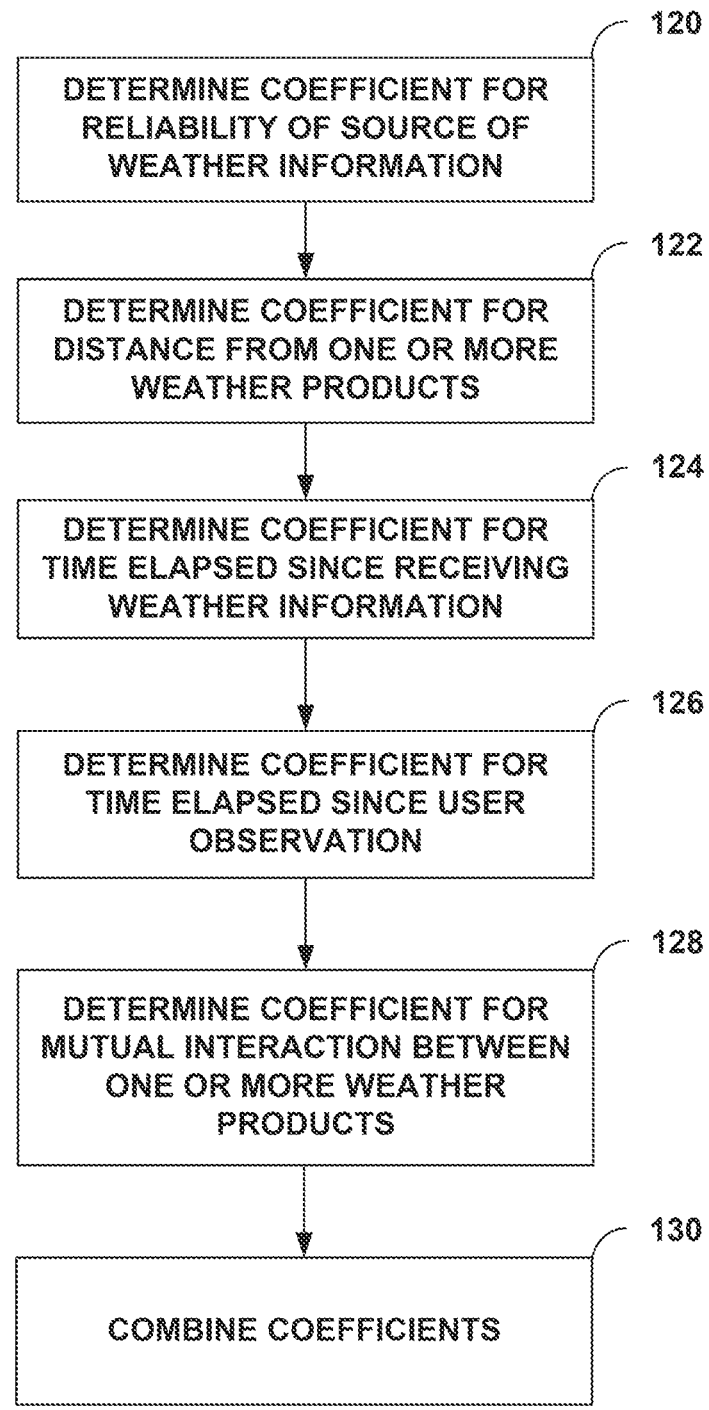
FIG. 2 is a flow diagram illustrating an example technique for determining coefficients used to determine a reliability index for a voxel in a volumetric buffer.

FIG. 2 is a flow diagram illustrating an example detailed technique for determining coefficients used to determine a reliability index for a voxel in a volumetric buffer that may be performed by system 10 and/or processor 12. For purposes of illustration only, the example operations are described below within the context of aircraft system 10, as shown in FIG. 1. However, in other examples, any part of the technique shown in FIG. 10 may be performed by another device.

Processor 12 may evaluate the likelihood of the actual occurrence of the weather product using the application of one or more rules. For example, processor 12 may determine that data from a more reliable source has higher reliability index value. For example, airborne radar returns may have the highest priority for convective phenomena, but for areas that are not covered by airborne radar (e.g. areas beyond radar coverage) or rain echo attenuation compensation technique (REACT) attenuated areas, processor 12 may supplement this data from other data sources, e.g., data from another aircraft (connected radar) or from ground radar. Processor 12 may determine that data from some of these other sources has lower reliability, and output a visual indication of the determined reliability of the data. As another example, processor 12 may determine that the presence of a certain weather phenomena increases or decreases the probability of the presence of another weather phenomenon, e.g., icing may not be present without clouds.

As another example of the rules applied by processor 12, when more or fewer weather products or weather data sources predict or report the same weather phenomenon, processor 12 may increase or decrease the reliability index, respectively, since one weather phenomenon may be described by multiple weather products. For example, if processor 12 determines that CAT is forecasted in some area and that PIREPs also report turbulence as being present in the same area, then processor 12 may determine there is an increased probability of CAT occurrence in the area. In some instances, short-range radar data may get a higher reliability rating than ground radar due to accuracy and age.

To determine a reliability index, processor 12 may perform each of the determinations shown in FIG. 2, or processor 12 may only perform a portion of the determinations shown in FIG. 2. Further, each of the determinations (e.g., calculations) and values provided below are examples, and other example calculations or values may be used in determining these coefficients and the overall reliability index.

In the example shown in FIG. 2, processor 12 may determine a coefficient for a reliability of a source of the weather information (120). Processor 12 may, for example, determine the sources that provided the received weather information, and determine coefficients associated with the sources in memory 16 of system 10. In some examples, particular sources of weather information are associated with (e.g., assigned) certain values of coefficients in memory 16 of system 10. For instance, a real-time forecast from an on-board radar system may be assigned a relatively high value (e.g., a one), a non-real-time observation, such as weather information from a ground radar system or PIREPs from pilots of other aircrafts, may be assigned a relatively middle value (e.g., a 0.7), and a forecast may be assigned a lower value (e.g., between a 0 and a 0.7). In some instances, forecasts may contain a probability determined by the weather source at the time the forecast is created (e.g., determined and provided by the source of the forecast). The probability may indicate, for example, the probability that a particular weather phenomenon predicted by the forecast will actually occur.

Processor 12 may determine a coefficient ($\beta$) for a distance of the source of the weather information to the weather product detected based on the weather information (122). The source of the weather information can be, for example, the ownship, one or more sources external to the ownship, or any combination thereof. The coefficient $\beta$ may be lower for weather information generated by a source that is further away from the weather product, and, conversely, the coefficient $\beta$ may be higher for a source that was closer to the weather product. In some examples, this coefficient may only apply to particular observations (e.g., this coefficient may not apply to ground-based observations, such as ground radar).

Processor 12 may determine the coefficient $\beta$ using any suitable technique. In some examples, processor 12 starts at a predetermined initial value of the coefficient $\beta$ (e.g., a zero or a one), and may decrease the value based on the application of particular rules for different sources. For instance, for an on-board radar, in one example, processor 12 may decrease the value of the coefficient $\beta$ by 0.05 for every 50 nautical miles (NM) of distance between the aircraft (or other source of the weather information) and the weather product (e.g., $\beta=x-0.05*$(lateral distance between ownship and observation in NM)/50)). For a CAT PIREP, in one example, processor 12 may decrease the value of the coefficient $\beta$ by 0.1 for every 5 NM of lateral distance and/or 1 flight level of vertical distance from the observation location (e.g., $\beta=x-0.1*$(lateral distance in NM/5)$-0.1*$(vertical distance between ownship and observation in flight levels)). For an icing PIREP, in one example, processor 12 may decrease the value of the coefficient $\beta$ by 0.1 for every 10 NM laterally and 10 flight levels vertically from the observation location (e.g., $\beta=x-0.1*$(lateral distance in NM)/10)$-0.1*$(distance(flight levels)/10)).

Processor 12 may also determine a coefficient ($\delta$) for a time elapsed since receiving the weather information from the source of the weather information or since the source generated the weather information (124). For instance, the coefficient $\delta$ may be lower for weather information (e.g., radar observations) that are older in time or received by processor 12 from the weather source a longer time ago, and, conversely, the coefficient $\delta$ may be higher for observations that are newer in time or received by processor 12 from the weather source more recently.

Processor 12 may determine the coefficient $\delta$ using any suitable technique. In some examples, processor 12 assigns the coefficient $\delta$ an initial predetermined value (e.g., a zero or a one), and decreases the value based on the application of particular rules for different sources. In one example, processor 12 decreases the value of the coefficient $\delta$ by certain predetermined value increments for every 10 minutes of time (or for any other mean units of time different than 10 minutes) that has elapsed since the weather information was first provided to processor 12 or was generated by the source of the weather information. One example of how the rule may apply to different sources is presented below in Table 1, with X being equal to the initial value of the coefficient:

TABLE 1

| PHENOMENA | AGING COEFFICIENT | COEFFICIENT $\delta$ |
|---|---|---|
| GROUND RADAR | 0.05 | X − 0.05 * (Age(min)/10) |
| SATELLITE | 0.01 | X − 0.01 * (Age(min)/10) |
| CAT PIREP | 0.05 | X − 0.05 * (Age(min)/10) |
| ICING PIREP | 0.01 | X − 0.01 * (Age(min)/10) |

Processor 12 may determine a coefficient ($\epsilon$) for a time elapsed since a user observation of the weather product from a vessel that contains the source of the weather information (126). The user observation can be, for example, observation by a human. Processor 12 may determine the coefficient $\epsilon$ using any suitable technique. In some examples, processor 12 assigns the coefficient $\epsilon$ an initial predetermined value (e.g., a zero or a one), and decrease the initial predetermined value based on the application of the rule $\epsilon=X-\epsilon1-\epsilon2$, with X being equal to the initial value. The first value, $\epsilon1$, may increase by a value, such as 0.1, for every unit of time after the issue time of the forecast, such as an hour (e.g., $\epsilon1$=age (hours)*0.1), as older forecasts can be less reliable. The second value, $\epsilon1$, may increase by a value, such as 0.1, for every unit of time, such as three hours, between the issue time and a validity time, or a time for which the forecast is projecting the weather product (e.g., $\epsilon2$=(valid_after_issue_time(hours)/3)*0.1), as forecasts for times further into the future may be less reliable.

Processor 12 may determine a coefficient ($\phi$) for a mutual interaction between the weather product and a second weather product to either compound or diminish the effects of the weather product (128). In this way, processor 12 may evaluate specific weather products in the context of all weather data. Some weather phenomena are mutually exclusive from one another (i.e., one weather phenomenon may not have any influence over a second weather phenomenon if certain conditions do not exist), and other weather phenomena may induce the presence of another weather phenomenon. Thus, detection of the weather product by processor 12 based on the received information in conjunction with the detection of one or more other detected weather product may be indicative of the reliability of the detection of the weather product, e.g., that it is a correction detection.

Processor 12 may determine the coefficient $\phi$ using any suitable technique. Processor 12 can assign the coefficient $\phi$ an initial predetermined value (e.g., a zero or a one), and decrease the initial value based on the application of particular rules. For instance, if a first weather product is forecasted to be present, but a second weather product is not forecasted, and the second weather product is required for the existence of the first weather product, then processor 12 may decrease the value of the coefficient $\phi$ by a predetermined decrement.

As an example, if icing is forecasted, but either no clouds are observed or no low temperature is observed based on the received weather information, then processor 12 may decrease the value of the coefficient $\phi$ by a predetermined amount (e.g., 0.2). Conversely, if clouds or low temperatures are observed in a forecast, then processor 12 may increase the value of the coefficient $\phi$ for predicted icing by the same amount. Similarly, if significant reflectivity is present, then processor 12 may increase the value of the coefficient $\phi$ for predicted turbulence by a higher predetermined value (e.g., 0.4), as the mutual interaction between significant reflectivity and turbulence is stronger than the mutual interaction between icing and clouds or low temperatures. In other words, if there is a stronger mutual interaction between two weather products, then processor 12 may adjust the coefficient $\phi$ to a larger degree than the instance of two weather products with a weaker mutual interaction.

The values by which processor 12 decreases or increases the coefficient $\phi$ may be predetermined and stored by memory 16. For example, memory 16 may store a different set of rules that associates different mutual interactions with different values. Processor 12 may then access memory 16, find a weather product detected for the voxel for which the reliability index is being generated, and determine what other weather products are also detected, e.g., for the same voxel or voxels adjacent to or otherwise near the voxel in 3D buffer 17. Processor 12 may then determine the predetermined values for incrementing or decrementing the initial value of the coefficient $\phi$ based on the values associated with the other detected weather products in memory 16.

In the technique shown in FIG. 2, processor 12 may combine each of the determined coefficients (e.g., coefficients associated with the one or more weather information sources, coefficient $\beta$, coefficient $\delta$, coefficient $\epsilon$, and coefficient $\phi$) to determine the reliability index (130). In some examples, processor 12 may add the coefficients together, with the sum equaling the reliability index. In other examples, processor 12 may multiply the coefficients together, with the product equaling the reliability index. In still other examples, some combination of multiplication and addition may be used to combine the coefficients. In some examples, processor 12 classifies the reliability index based on the value of the reliability index. These categories may be based on a percentage of the maximum possible reliability (e.g., 0% to 30% of the maximum may be classified as having low reliability, 30% to 60% of the maximum may be classified as having moderate reliability, and 60% to 100% of the maximum may be classified as being highly reliable).

Further, processor 12 may generate a weather display that displays the categories of reliability indices differently. For instance, a graphical indication of a weather product with a reliability index in the lowest category, i.e., the category with the lowest reliability, may be displayed with one set of visual characteristics (e.g., highest level of transparency or the lowest granularity). A graphical indication of a weather product with a reliability index in the middle category, i.e., the category with a moderate level of reliability, may be displayed with a second set of visual characteristics (e.g., a medium level of transparency or a medium level of granularity). A graphical indication of a weather product with a reliability index in the highest category, i.e., the category with the highest level or reliability, may be displayed with a third set of visual characteristics (e.g., a low level of transparency or a high level of granularity).

Other techniques for indicating the relative reliability indicated by a determined reliability index may be used in other examples.

In some instances, processor 12 may recalculate the corresponding reliability index for a particular weather product, repeating the process shown in FIG. 2. In such instances, the additional time and/or updated weather information may be taken into account. In some instances, processor 12 may recalculate the corresponding reliability index whenever updated weather information is received from radar system 14 or from a source external to the vessel. In other instances, processor 12 may recalculate the corresponding reliability index after a predetermined amount of time has passed (e.g., a minute, thirty minutes, an hour, etc.) or after the vessel has travelled a predetermined amount of distance (e.g., a mile, one hundred miles, one nautical mile, etc.).

Figure 3:
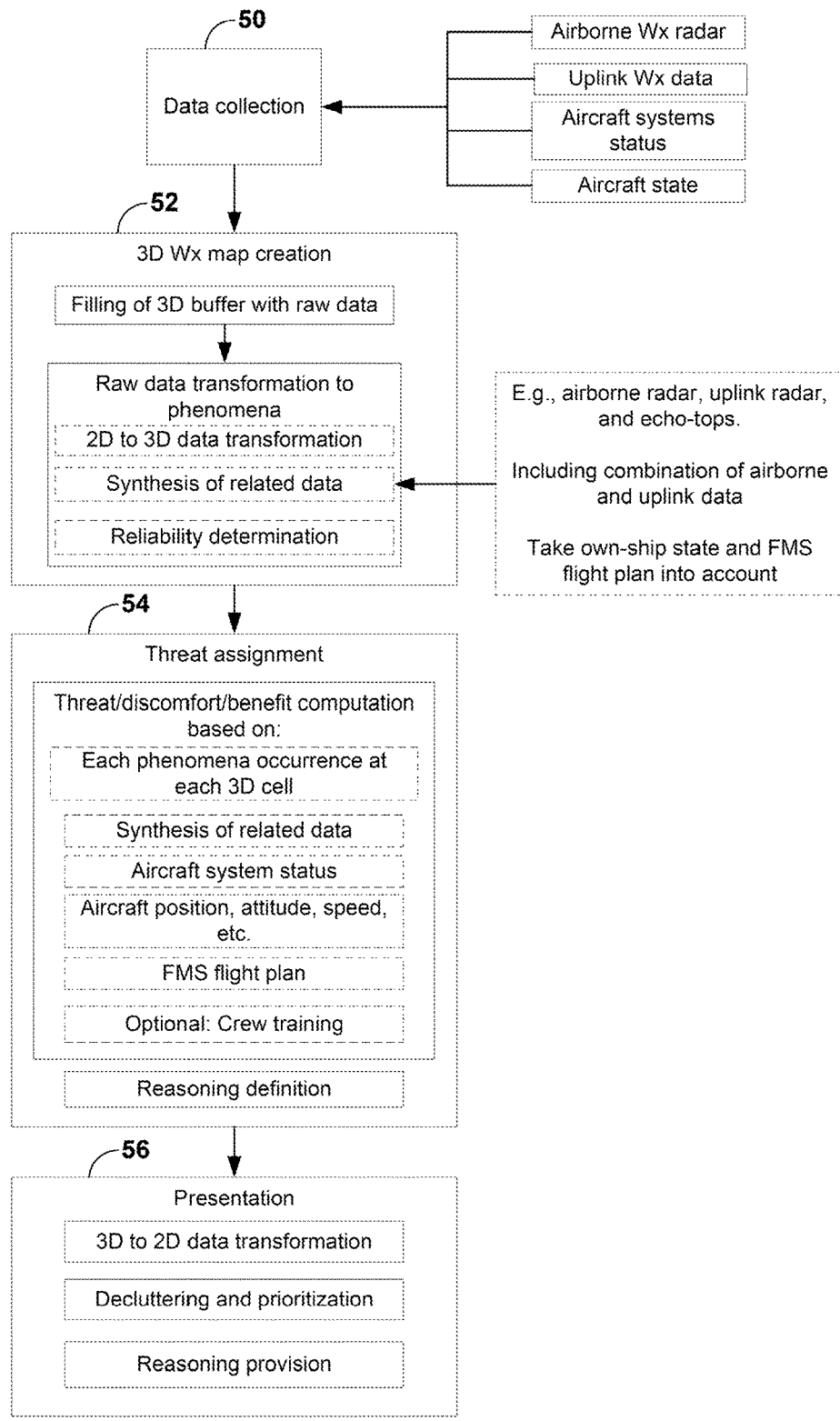
FIG. 3 is a flow diagram illustrating an example algorithm, that may be performed by a system comprising one or more processors, for determining and displaying a reliability index for a detected weather product.

An example technique for determining and displaying threat levels for various volumes of airspace is shown with respect to FIG. 3. FIG. 3 a flow diagram illustrating an example algorithm, that may be performed by a system (e.g., system 10 of FIG. 1) comprising one or more processors (e.g., processor 12 of FIG. 1), for determining and displaying a reliability index weather product in a volumetric buffer, in accordance with one or more techniques of this disclosure.

In the data collection portion 50 of the flow diagram, system 10 (e.g., processor 12) may collect data. The data may include weather information generated by radar system 14 (FIG. 1), weather information received from one or more sources external to the ownship, or any combination thereof. For example, the data may include uplink weather products (e.g. Winds Aloft forecast, Icing forecast, Clear Air Turbulence (CAT) forecast, Composite Radar, Satellite derived height of clouds, etc.), airborne weather radar, a type of operation (e.g., whether the flight is Part 91, 121 or 135 operation as described in the U.S. Federal Aviation Regulations (FARs) in Title 14 of the Code of Federal Regulations (C.F.R.), etc.), a current flight management system (FMS) flight plan, current aircraft systems status (e.g. engines, de-icing system, ILS, etc.), and a current aircraft state data (e.g., position, airspeed, altitude, track, pitch, heading, flight path angle, etc.). Optionally, processor 12 may also determine a crew training level (e.g. if the crew is trained for category III ILS).

Figure 4A:
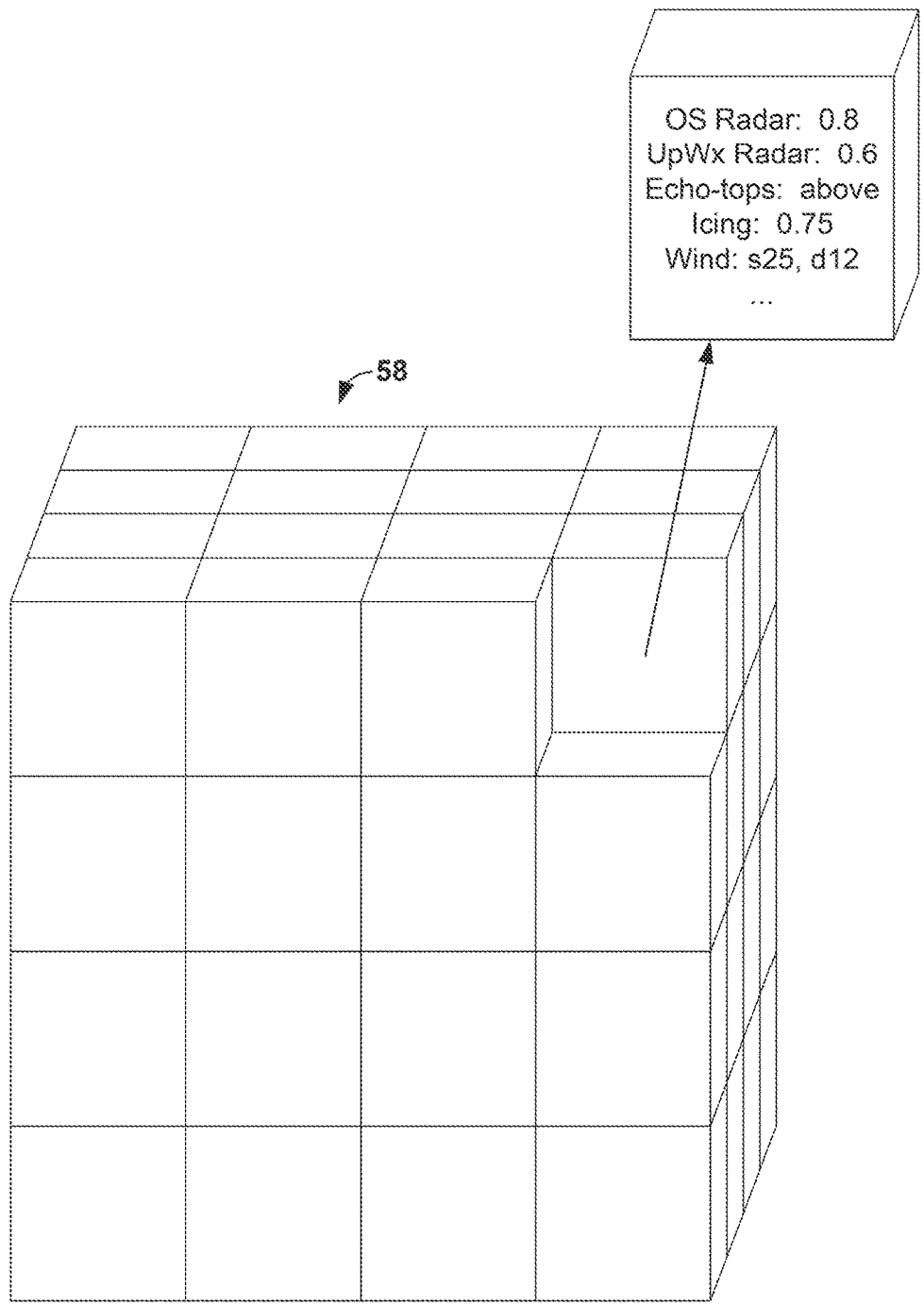
FIG. 4A is a conceptual diagram illustrating an example volumetric buffer and raw weather data for a particular voxel within the volumetric buffer.

Processor 12 may then create a 3D weather map (52), such as the volumetric buffer shown in FIG. 4A. FIG. 4A is a conceptual diagram illustrating an example volumetric buffer 58 and raw data for a particular voxel within volumetric buffer 58. Volumetric buffer 58 is an example of 3D or 4D buffer 17, shown in FIG. 1. In this step, processor 12 fills volumetric buffer 58 with raw weather data collected from the previous step. For each voxel within volumetric buffer 58, there are a number of data parameters available for the associated volume of airspace, e.g., intensity of ground radar reflectivity, height of detected echo top, wind speed and direction. The raw data may include actual values, such as actual wind speed, actual icing content, and the like.

Figure 4B:
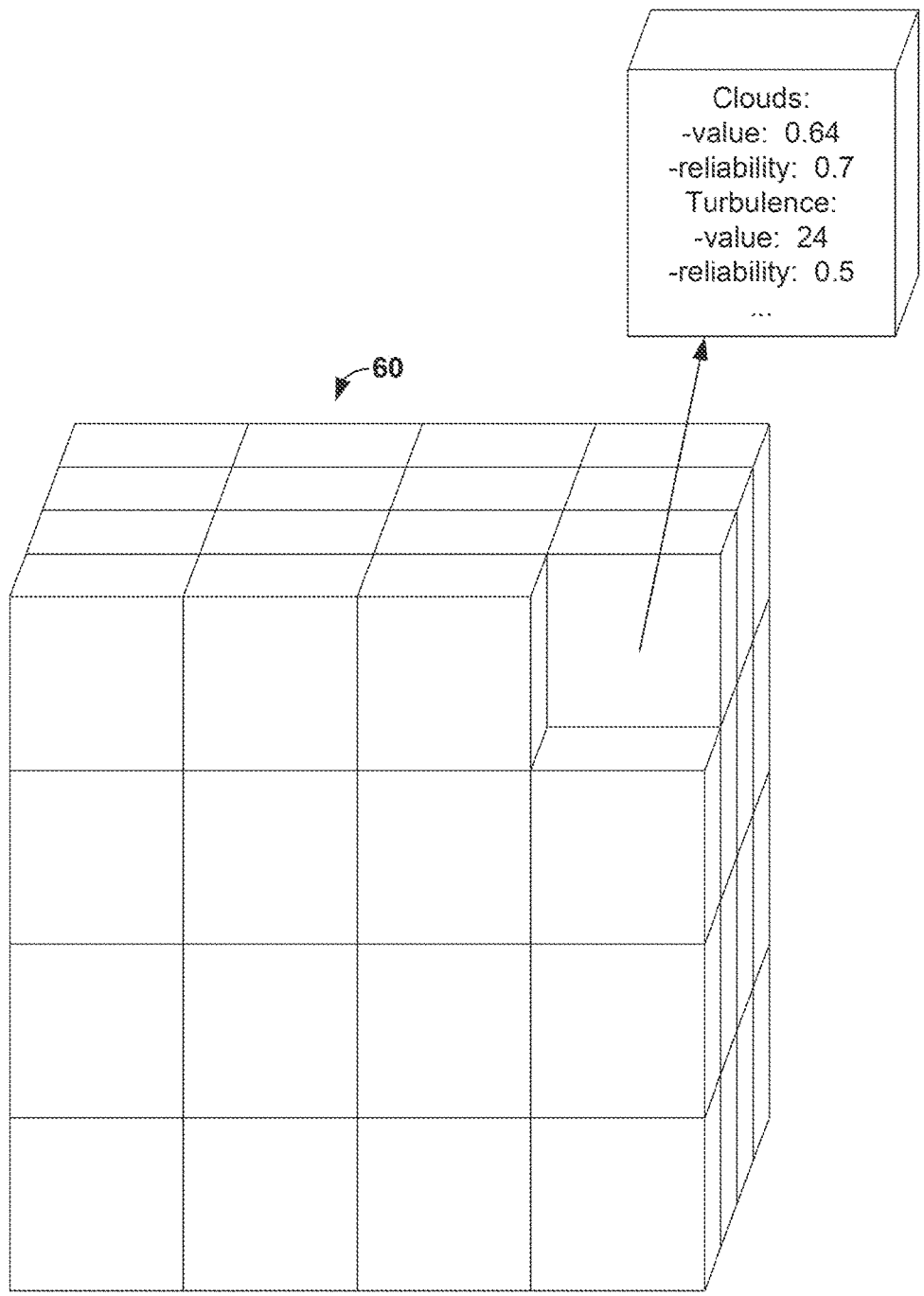
FIG. 4B is a conceptual diagram illustrating an example volumetric buffer and weather product data for a particular voxel within the volumetric buffer.

Processor 12 may then transform the raw weather data to weather products, as shown in FIG. 4B. FIG. 4B is a conceptual diagram illustrating an example volumetric buffer 60 and weather product data for a particular voxel within volumetric buffer 60. 3D volumetric buffer 60 is an example of volumetric buffer 17, shown in FIG. 1. Processor 12 may transform volumetric buffer 58 with raw weather data to volumetric buffer 60 containing weather products with additional properties, such as one or more of intensity, a threat level, or a reliability index. For each voxel within volumetric buffer 60, processor 12 may maintain a list of all weather products presented in the associated volume of airspace, e.g., height of clouds or intensity of turbulence, together with a reliability index.

Figure 5:
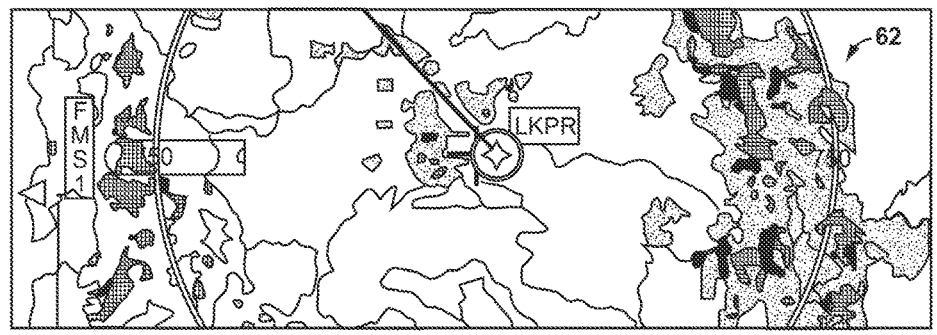
FIG. 5 is an example weather display showing ground radar intensity.
Figure 6:
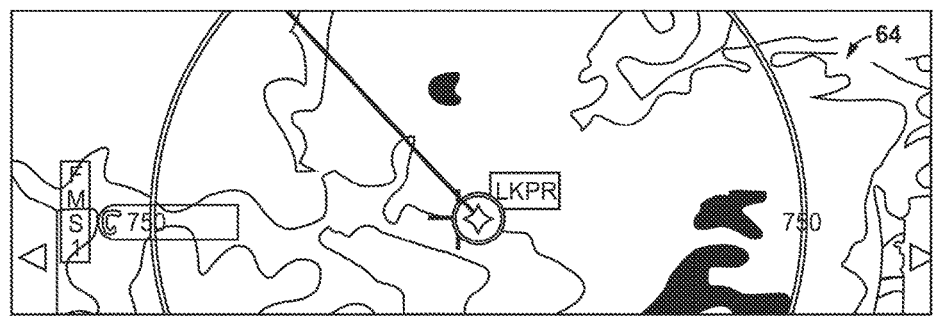
FIG. 6 is an example weather display showing an echo top altitude.

In some examples, to transform raw data to weather products, processor 12 may first transform 2D data to define the 3D buffer. In this step, processor 12 may create pseudo 3D weather products, which can be a weather product defined in a 2D space that is projected into 3D space corresponding to the 3D buffer. Processor 12 may combine two or more weather products together if they represent the same weather phenomenon from a different data source. For example, processor 12 may combine intensity of a weather product as detected by onboard radar system 14 (e.g., as shown in FIG. 5, which is an example ground radar intensity 62) with another weather product which represents altitude of the weather structure as detected via echo top (e.g., as shown in FIG. 6, which is an example echo top altitude 64). Thus, processor 12 may combine data related to a given weather phenomenon, but the data is from different weather products or sources. The result is a pseudo 3D weather product, which contains altitude and intensity of a given weather product, such as, in this case, and intensity of the storm and its height.

Figure 7:
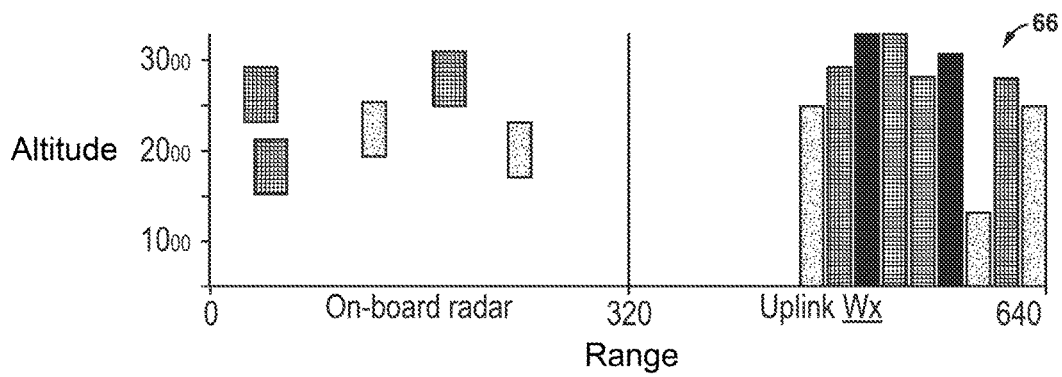
FIG. 7 is an example of a pseudo-three-dimensional weather product for a vertical situation display.

In some examples, processor 12 may also directly visualize the result within a vertical situation display (VSD) presentation, where the result is combined with a true 3D product, or a weather product defined by weather information in 3D space rather than 2D space. An example of such presentation is presented in FIG. 7, which is an example of a pseudo-3D product that may be generated by processor 12 for a vertical situation display 66. The left part of the image represents data from airborne radar (e.g., true 3D). On the right part of the image, after 320 nm, the pseudo 3D radar (e.g., a combination of composite ground radar and echo tops by processor 12) is presented, where processor 12 derives color from ground radar and height from echo top.

Processor 12 may synthesize related weather data. For example, processor 12 may synthetize all weather information data together, such that system 10 may present information from all uplink weather products and airborne radar in a combined manner. By being configured to combine weather information received from multiple sources, including sources outside of the aircraft, processor 12 may virtually extend coverage of onboard radar system 14 through the addition of external radar readings, external forecasts, and observations from other vessels. Further, by including additional weather information to the weather information determined from onboard radar system 14, processor 12 may virtually increase weather product sensitivity of onboard radar system 14, by enabling the inclusion of non-convective weather products that are not detected by airborne radar, e.g., CAT or icing. Processor 12 may, in some examples, further determine a reliability index for a detected weather product, e.g., using the technique described with reference to FIG. 2.

Figure 8:
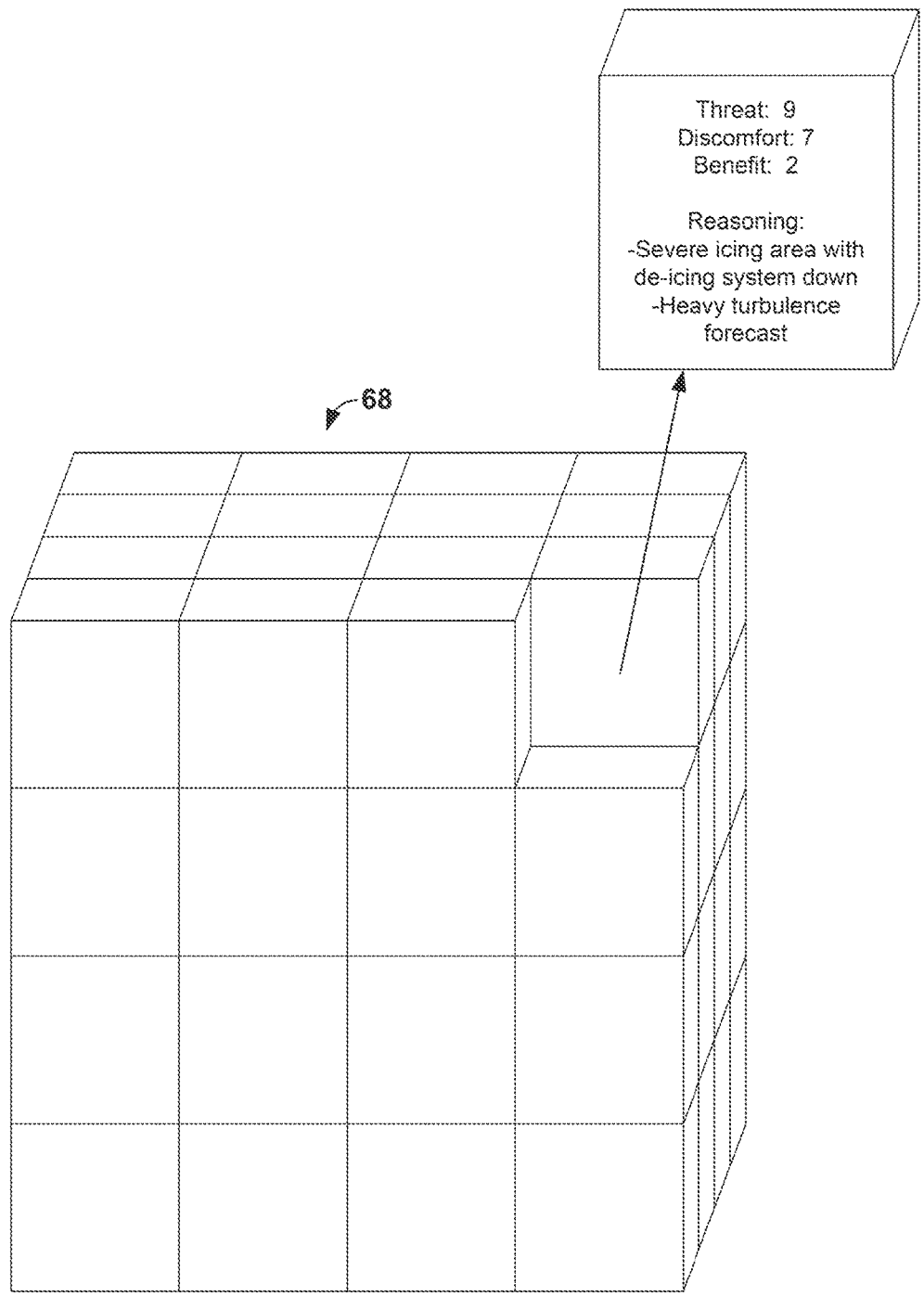
FIG. 8 is a conceptual diagram illustrating an example volumetric buffer, threat level data, and a weather description for a particular voxel within the volumetric buffer.

Processor 12 may assign a threat and/or discomfort level to each voxel in volumetric buffer 68 (54), e.g., as shown in FIG. 8. The threat level indicates, for example, the relative severity or concern of a weather product detected for the volume of airspace associated with the voxel. FIG. 8 is a conceptual diagram illustrating an example volumetric buffer 68 and threat level data and determination by processor 12 for a particular voxel within volumetric buffer 68. Volumetric buffer 68 is an example of volumetric buffer 17, as shown in FIG. 1. In this step (54), processor 12 assigns a threat level to each voxel in volumetric buffer 68, together with the reasons of why it is recognized as threat.

In some examples, processor 12 may assign an initial threat level to a weather product based on the type of weather product alone. A plurality of types of weather products and associated initial threat levels may be stored by memory 16. For instance, particular types of weather products having particular intensities may have a particular threat level, with processor 12 either storing predetermined threat levels for such weather products or calculating threat levels based on characteristics of the weather product (e.g., size, location, intensity, etc.). Processor 12 may then alter the threat level for the product based on the type of the aircraft, aircraft systems status, and aircraft state data.

In some examples, processor 12 may assign a threat as a function of aircraft type (e.g. CAT affects different aircrafts in different ways), aircraft systems status, detected weather products associated with the voxel (e.g., different weather phenomena present different threats), and aircraft state data (e.g., current position, altitude, speed, flight plan, etc.). The threat level can be affected by not only by weather phenomena itself, but also by the current aircraft systems status. For instance, de-icing may work well on a two-jet engine aircraft, but if one engine is inoperative, then the power for deicing may be impacted and, therefore, icing may present a higher threat level. Further, if a de-icing system of an aircraft is not present or operational, then icing may pose a more significant threat level. Thus, processor 12 may increase the threat level for a weather product if the aircraft type or the aircraft systems status indicate that the aircraft is not configured to encounter the particular weather product (e.g., one or more aircraft systems are not configured to mitigate effects of the weather product on flight of the aircraft). Conversely, processor 12 may decrease the threat level for a weather product if the aircraft systems are configured to mitigate certain effects of the weather product.

As another example, a weather product closer to the aircraft or flight plan may imply a higher threat level to the aircraft. Processor 12 may be configured to apply different threat proximity boundaries will be different for different types of weather products. For example, CAT 5,000 feet (e.g., 1524 meters) below an aircraft may be a relatively low threat level, but volcanic ash 5,000 feet below the aircraft may be considered as a relatively high threat to the aircraft. Thus, processor 12 may increase the threat level for weather products where the aircraft will be travelling through airspace that the weather product may affect (even if the weather product is not specifically in such airspace). Conversely, processor 12 may decrease the threat level for weather products where the aircraft will travel through airspace that generally avoids the effects of the weather product or, at least, decreases the effect that the weather product will have on the aircraft.

In some examples, processor 12 may assign a threat level to a voxel as a function of crew training limitations and type of aircraft operations. For example, processor 12 may determine that low ceiling and visibility may not pose a relatively high threat to commercial aviation operations and properly trained crew for a category III ILS approach, but that they may present a relatively high threat to aircraft which need to fly in visual conditions (due to equipment or crew training limitations). Thus, processor 12 may decrease the threat level for weather products when the aircraft crew is specifically trained or certified to fly the aircraft through airspace having the weather product. Conversely, processor 12 may increase the threat level for weather products that the crew is not formally trained or certified to fly through.

Processor 12 may present the data to the pilot (56). For example, processor 12 may present computed data from 3D buffer 17 containing, for at least one voxel, a weather product and an associated reliability index, a threat level, and associated reasoning to the pilot. Processor 12 may present the data using any suitable technique. In some examples, processor 12 generates and displays, via display 20, a weather display that includes a graphical indication of one or more detected weather products, a graphical indication of the corresponding reliability indices for the displayed weather products. In some examples, processor 12 further generates and displays, via display 20, a graphical indication of the corresponding threat level for the displayed weather products. In some instances, each graphical indication may be separate (e.g., the graphical indication of the weather product may overlay a particular area of the display, and the graphical indications of the corresponding reliability index and threat level may be additional textual indications). In other instances, the graphical indication of the weather product may be altered by the graphical indications of the corresponding reliability index and threat level. For instance, the graphical indication of the weather product may overlay a particular area of the display, the graphical indication of the threat level for the corresponding weather product may adjust the color of the graphical indication of the weather product, and the graphical indication of the reliability index for the corresponding weather product may adjust the granularity of the graphical indication of the weather product. An example of such a display is described below with respect to FIG. 11.

In some examples, processor 12 may transform the 3D buffer to a 2D visual representation. Processor 12 may be configured to present data from the 3D buffer on a 2D lateral map by taking a slice (either horizontal or vertical) of the 3D buffer and displaying graphical indications of the weather products in the slice. In examples in which a threat level was already assigned to the voxel, processor 12 may present only threat levels that are "relevant" at various altitudes on the 2D map display.

Processor 12 may declutter the weather information display automatically, or in response to user input received via user interface 18. For example, processor 12 may declutter the weather information display by the level of the assigned threat, where a more severe threat is prioritized over a lower threat. In other words, processor 12 may remove from the weather information display graphical indications of weather products associated with threat levels below a predetermined threshold. The predetermined threshold can be stored by memory 16, or may be inputted by a user via user interface 18.

Figure 9:
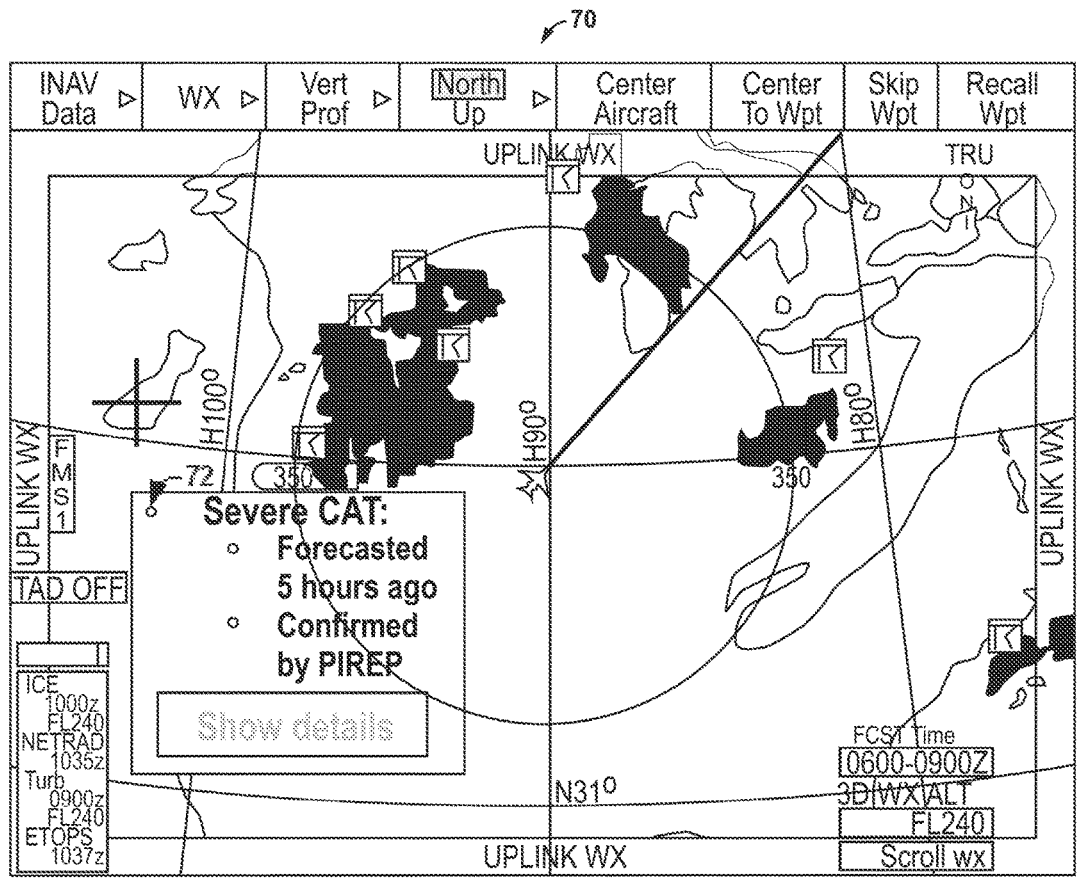
FIG. 9 is an example explanation of a threat on an integrated avionics display.

In some examples, processor 12 may also provide reasoning details (automatically or in response to user input) that describe the characteristics of the weather product that contributed to the weather product having the corresponding threat level. For example, processor 12 may provide the reasons for a specific threat level, so the pilot can understand the associated weather product in more detail. As an example, processor 12 may present an output informing the pilot of the underlying reasons of a CAT threat presented at some location. In some examples, system 10 may receive, via user interface 18, user inputs to select that area of the displayed data and respond by presenting an explanation of why it is considered as a threat is revealed. This example is presented in FIG. 9, which is an example explanation of a threat on an integrated avionics display 70. In FIG. 9, the grey dialog 72 provides the explanation. In some examples, system 10 may present the interpreted data (e.g., the threat level) rather than the raw data calculated from the radar returns.

Using the techniques described herein, system 10 may use a weather threat-based color scheme that combines multiple weather products that are otherwise used one-at-a-time. Currently, the pilots may be provided with only raw weather data and it is the pilot's task to interpret them correctly and assessing the threat manually. However, multiple weather information sources exist with different properties, forecasts have different reliabilities, data may be not up-to-date, weather products may have different issue times, and there may be conflict in data between weather products for the same phenomena given by e.g. different issue time or different source of data (e.g., a discrepancy between 20 hours old forecast and 30 minutes old Meteorological Terminal Aviation Routine Weather Report (METAR) weather information). By combining weather information from multiple sources using the techniques described herein, the deficiencies of particular sources of weather information may be cured through the utilization of other weather sources, providing the pilot with a more complete depiction of the weather proximate to the pilot's vessel.

Figure 10:
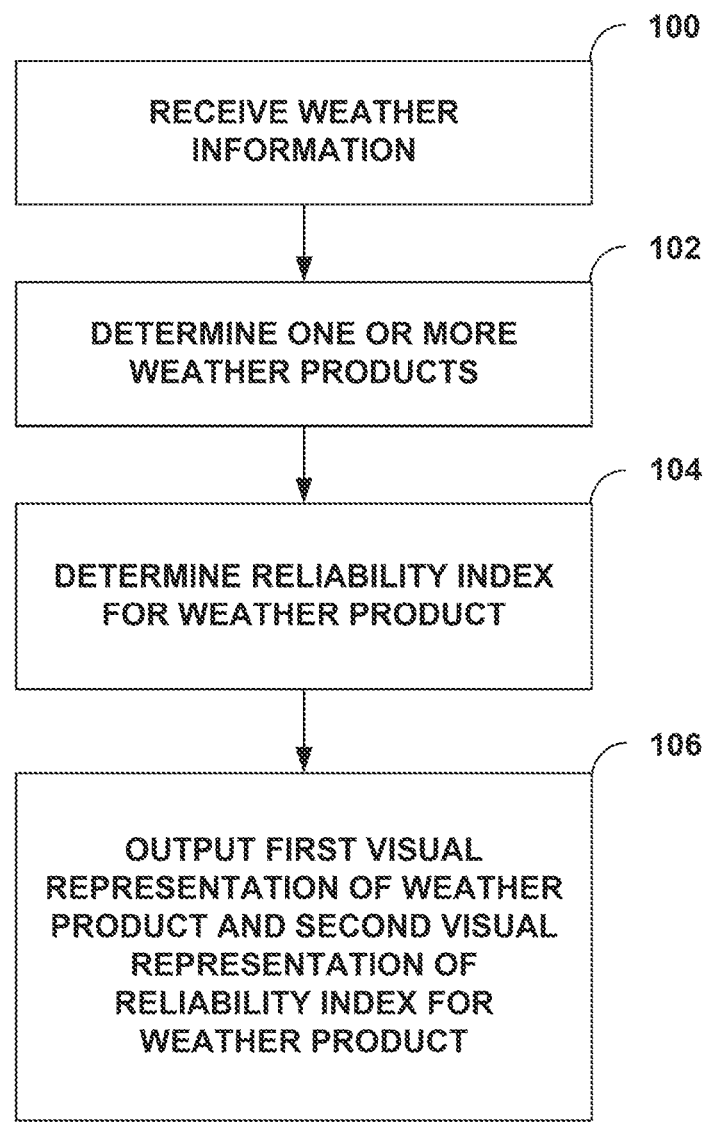
FIG. 10 is a flow diagram illustrating an example technique for determining and displaying a reliability index for a voxel in a volumetric buffer.

FIG. 10 is a flow diagram illustrating an example technique for determining and displaying reliability index for a voxel in a 3D or 4D volumetric buffer that may be performed by processor 12 or another processor of system 10 or another system. For purposes of illustration only, the example operations are described below within the context of aircraft system 10, as shown in FIG. 1. However, in other examples, any part of the technique shown in FIG. 10 may be performed by another device.

Processor 12 may be configured to receive weather information (100), e.g., from radar system 14, one or more weather sources external to the vehicle for which processor 12 is determining the weather information, or combinations thereof. For at least one voxel of a plurality of voxels of volumetric buffer 17, processor 12 may determine, based at least in part on the weather information, a weather product for the respective voxel (102). Volumetric buffer 17 may be a 3D volumetric buffer or a 4D volumetric buffer. Processor 12 may determine the weather product using any suitable technique. In some examples, processor 12 may store the reflectivity data and other weather information in a particular voxel of volumetric buffer 17 that corresponds to the location of the airspace referenced by the received weather information. Processor 12 may analyze the weather information stored in the particular voxel and, based on the weather information, determine a weather product that may be present in the location of the airspace corresponding to the particular voxel. For instance, if the voxel stores data that indicates high radar reflectivity values, processor 12 may determine that a storm cell (a particular type of weather product) is present in the voxel. Different types of weather products may be associated with different radar reflectivity value ranges (e.g., as defined by upper and lower values), and this information may be stored by memory 16 and accessed by processor 12 to detect weather products.

Processor 12 may determine, based at least in part on the weather product and the received weather information, a reliability index for the weather product, the reliability index indicating a degree of confidence that one or more characteristics of the weather product are accurate (104). For example, processor 12 may determine the reliability index using the technique described above with respect to FIG. 2. Processor 12 may determine the reliability index for the weather product automatically in some examples, or in response to user input in other examples.

Processor 12 may further output, for display at the display device, a first visual representation of the weather product and a second visual representation of the reliability index for the weather product (106). In some instances, each graphical indication may be separate (e.g., the graphical indication of the weather product may overlay a particular area of the display, and the graphical indications of the corresponding reliability index indices may be additional textual indications). In other instances, the graphical indication of the weather product may be altered by the graphical indications of the corresponding reliability index and threat level. For instance, the graphical indication of the weather product may overlay a particular area of the display, and the graphical indication of the reliability index for the corresponding weather product may adjust the granularity of the graphical indication of the weather product. An example of such a display is described below with respect to FIG. 11.

Figure 11:
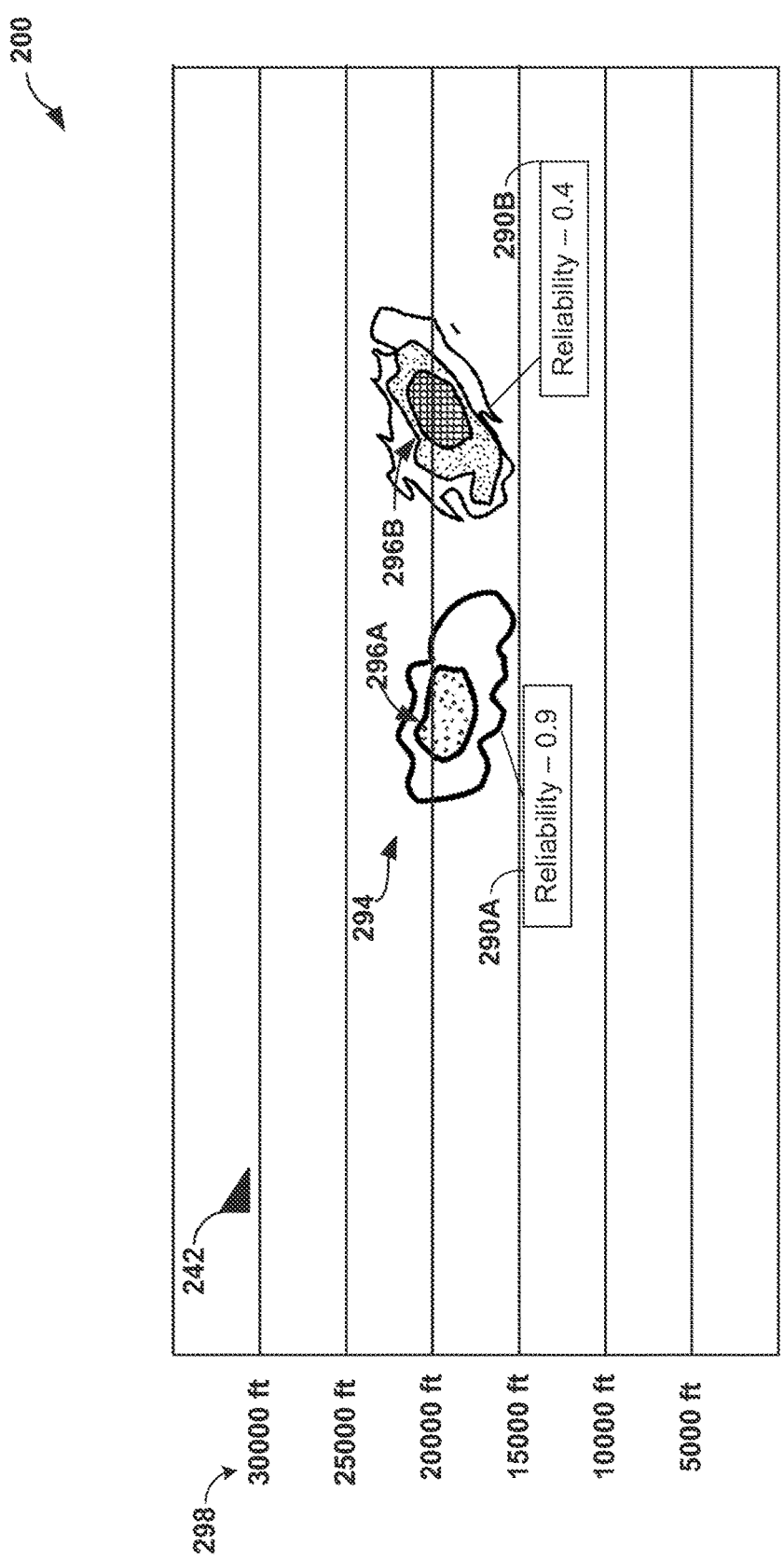
FIG. 11 is an example display that includes a graphical indication of a weather product and a graphical indication of a corresponding reliability index.

FIG. 11 is an example display 200, which is a vertical profile display 200, that includes a graphical indication of the ownship 242, a plurality of altitude indications 298 along the vertical axis of the display, graphical indications 296A and 296B of weather products showing reflectivity information 294, and graphical indications 290A and 290B of the corresponding reliability indices for the weather products. In addition, display 200 may, in some examples, also include one or more of horizontal distance lines, a terrain depiction, graphical indications of other aircraft, and the like. While shown as a vertical profile display, example displays in accordance with the techniques described herein may include plan view displays, as well as any other type of display suitable for depicting weather products and corresponding reliability indices.

As shown in FIG. 11, weather product 296A is shown alongside the associated reliability index 290A. While reliability index 290A is shown as a text box, weather product 296A is also shown with bolder lines and a high level of granularity, which may also be indicative of the higher reliability index for weather product 296A (e.g., 0.9). Conversely, weather product 296B, which is shown alongside the associated reliability index 290B, is shown with thinner lines and a lower level of granularity, which may be indicative of the lower reliability index for weather product 290B (e.g., 0.4) in relation to reliability index 290A. The reliability indices 290A, 290B are shown displayed adjacent to otherwise in close proximity to the respective weather products 296A, 296B. Further, lines are used in display 200 to visually connect the reliability indices 290A, 290B with the respective weather products 296A, 296B. In other examples, reliability indices 290A, 290B may be displayed within the displayed graphical representations of the weather products 296A, 296B, or displayed elsewhere within display 200.

FIG. 11 is a flow diagram illustrating an example technique for determining and displaying a threat level for a voxel in a volumetric buffer that may be performed by system 10 and/or processor 12, in accordance with the techniques of this disclosure. For purposes of illustration only, the example operations are described below within the context of aircraft system 10, as shown in FIG. 1. However, in other examples, any part of the technique shown in FIG. 10 may be performed by another device.

Figure 12:
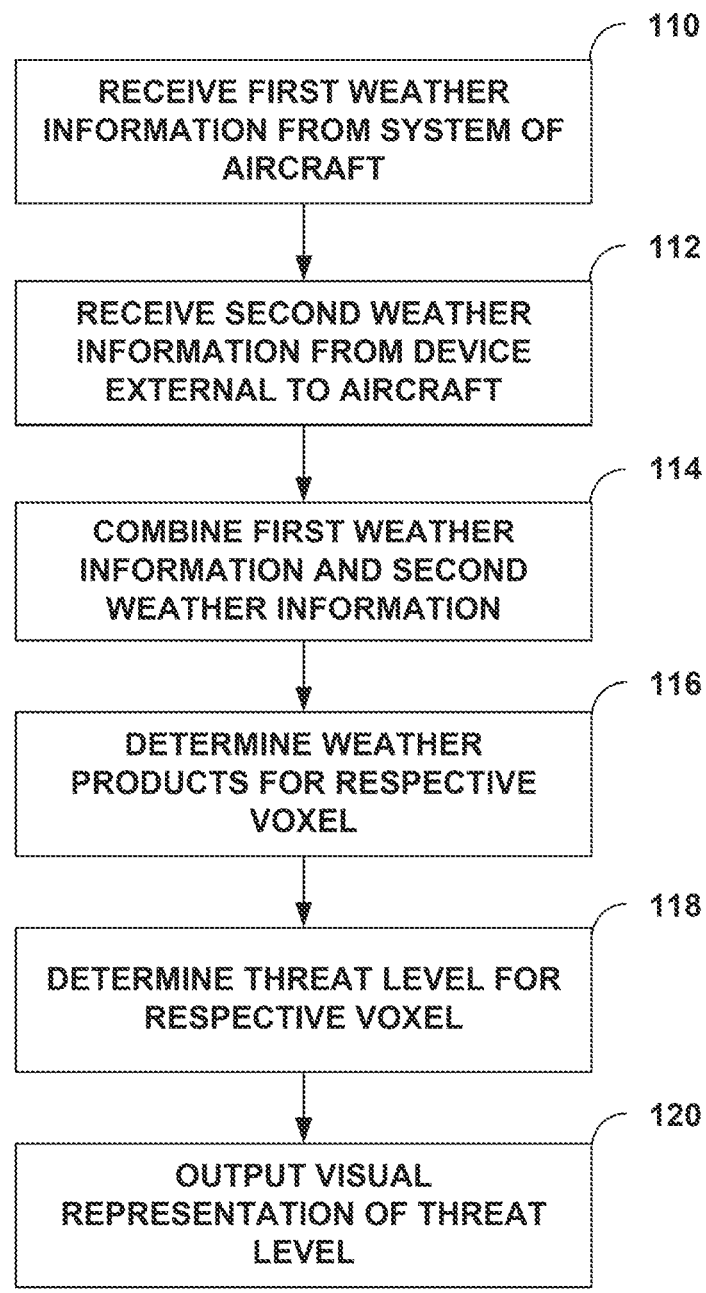
FIG. 12 is a flow diagram illustrating an example technique for determining and displaying a threat level for a voxel in a volumetric buffer.

In the technique shown in FIG. 12, processor 12 receives first weather information from a system of an aircraft (110) and receives second weather information from a device external to the aircraft (112). Processor 12 may combine the first weather information and the second weather information to determine combined weather information (114). For at least one voxel of volumetric buffer 17, processor 12 may be configured to determine, based at least in part on the combined weather information, one or more weather products for the respective voxel (116, e.g., as described above with respect to FIG. 10), and determine, based at least in part on the determined one or more weather products and at least one of aircraft systems status information for the aircraft or aircraft state data for the aircraft, a threat level for the respective voxel (118). Volumetric buffer 17 may be either a 3D volumetric buffer or a 4D volumetric buffer. Processor 12 may then be configured to output, via the display device, a visual representation of the threat level for at least one voxel of volumetric buffer 17 (120).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising:
   receiving, by a processor of a weather system, first weather information generated by a first source;
   receiving, by the processor, second weather information generated by a second source different from the first source, wherein the second source comprises a device external to an aircraft;
   combining, by the processor, the first weather information and the second weather information to determine combined weather information; and
   for at least one voxel of a plurality of voxels of a volumetric buffer:
     determining, by the processor and based at least in part on the combined weather information, a weather product for the respective voxel;
     determining, by the processor, a first reliability index for the weather product based on the first weather information;
     determining, by the processor, a second reliability index for the respective voxel based on the second weather information;
     determining, by the processor and based at least in part on the weather product, the combined weather information, the first reliability index, and the second reliability index, a combined reliability index for the weather product, the combined reliability index indicating a degree of confidence that one or more characteristics of the weather product are accurate; and outputting, by the processor and for display at a display device, a first visual representation of the weather product and a second visual representation of the combined reliability index for the weather product.

2. The method of claim 1, wherein determining the second reliability index comprises:

determining, by the processor, respective coefficients for at least one of: a reliability of the second source, a distance of the second source of from the weather product, a time elapsed since receiving the second weather information or since the second weather information was generated, or a time elapsed since a user observation of the second weather product from a vessel that contains the second source; and combining, by the processor, the respective coefficients.

3. The method of claim 1, wherein the first source comprises an onboard radar system of the aircraft.

4. The method of claim 1, wherein combining the first weather information and the second weather information comprises:

determining, by the processor and based on the first weather information, radar intensity information associated with a first weather product in a two-dimensional horizontal plane of a three-dimensional region of airspace represented by the volumetric buffer;

determining, by the processor and based on the second weather information, altitude data associated with a second weather product in the three-dimensional region of airspace;

determining, by the processor, that the first weather product is located in a same area of the three-dimensional region of airspace as the second weather product; and merging, by the processor, the first weather information for the first weather product with the second weather information of the second weather product.

5. The method of claim 1, further comprising, for the at least one voxel of the three-dimensional buffer:

determining, by the processor and based at least in part on the weather product, aircraft systems status information, and aircraft state data, a threat level for the respective voxel; and outputting, by the processor and for display at the display device, a visual representation of the threat level for the respective voxel, wherein the combined reliability index further indicates a calculated confidence of the threat level for the respective voxel.

6. The method of claim 5, wherein the aircraft systems status comprises at least one of engine information, a status of a de-icing system, a training level of an aircraft crew, a status of a weather system, or a status of an approach system, and wherein the aircraft state data comprises at least one of a position of the aircraft, an airspeed of the aircraft, an altitude of the aircraft, a track of the aircraft, a pitch of the aircraft, a heading of the aircraft, a flight path angle, a roll of the aircraft, an angle of the aircraft, or a yaw angle of the aircraft.

7. The method of claim 1, wherein the volumetric buffer comprises one of a three-dimensional volumetric buffer or a four-dimensional volumetric buffer.

8. A system comprising:
a display device; and
a processor configured to:

receive first weather information generated by a first source, receive second weather information generated by a second source different from the first source, wherein the second source comprises a device external to an aircraft, combine the first weather information and the second weather information to determine combined weather information, and for at least one voxel of a plurality of voxels of a volumetric buffer:

determine, based at least in part on the combined weather information, a weather product for the respective voxel, determine a first reliability index for the weather product based on the first weather information, determine a second reliability index for the respective voxel based on the second weather information, determine, based at least in part on the weather product, the combined weather information, the first reliability index, and the second reliability index, a combined reliability index for the weather product, the combined reliability index indicating a degree of confidence that one or more characteristics of the weather product are accurate, and output, for display at the display device, a first visual representation of the weather product and a second visual representation of the combined reliability index for the weather product.

9. The system of claim 8, wherein the processor is configured to determine the second reliability index by at least:

determining respective coefficients for at least one of: a reliability of the second source, a distance of the second source from the weather product, a time elapsed since receiving the second weather information or since the second weather information was generated, a time elapsed since a user observation of the second weather product from a vessel that contains the second source, and combining the respective coefficients.

10. The system of claim 8, wherein the processor is configured to combine the first weather information and the second weather information to determine combined weather information by at least:

determining, based on the first weather information, radar intensity information associated with a first weather product in a two-dimensional horizontal plane of a three-dimensional region of airspace;

determining, based on the second weather information, altitude data associated with a second weather product in the three-dimensional region of airspace;

determining that the first weather product is located in a same area of the three-dimensional region of airspace as the second weather product; and merging the first weather information for the first weather product with the second weather information of the second weather product.

11. The system of claim 8, wherein the processor is further configured to, for the at least one voxel of the plurality of voxels of the three-dimensional buffer:

determine, based at least in part on the weather product, aircraft systems status information, and aircraft state data, a threat level for the respective voxel, and output, for display at the display device, a visual representation of the threat level for the respective voxel, wherein the combined reliability index indicates a calculated confidence of the threat level for the respective voxel.

12. The system of claim 11, wherein the aircraft systems status comprises at least one of engine information, a status of a de-icing system, a training level of an aircraft crew, a status of a weather system, or a status of an approach system, and wherein the aircraft state data comprises at least one of a position of the aircraft, an airspeed of the aircraft, an altitude of the aircraft, a track of the aircraft, a pitch of the aircraft, a heading of the aircraft, a flight path angle, a roll of the aircraft, an angle of the aircraft, or a yaw angle of the aircraft.

13. A non-transitory computer-readable medium including instructions that, when executed by a processor, cause the processor to:

receive first weather information generated by a first source, receive second weather information generated by a second source different from the first source, wherein the second source comprises a device external to an aircraft, combine the first weather information and the second weather information to determine combined weather information, and for at least one voxel of a plurality of voxels of a volumetric buffer:

determine, based at least in part on the combined weather information, a weather product for the respective voxel, determine a first reliability index for the weather product based on the first weather information, determine a second reliability index for the respective voxel based on the second weather information, determine, based at least in part on the weather product, the combined weather information, the first reliability index, and the second reliability index, a combined reliability index for the weather product, the combined reliability index indicating a degree of confidence that one or more characteristics of the weather product are accurate, and output, for display at the display device, a first visual representation of the weather product and a second visual representation of the combined reliability index for the weather product.

14. The non-transitory computer-readable medium of claim 13, wherein the instructions that cause the processor to determine the second reliability index comprise instructions that, when executed by the processor, cause the processor to:

determine respective coefficients for at least one of: a reliability of the second source, a distance of the second source from the weather product, a time elapsed since receiving the second weather information or since the second weather information was generated, a time elapsed since a user observation of the second weather product from a vessel that contains the second source, and combine the respective coefficients.

15. The non-transitory computer-readable medium of claim 13, wherein the processor combines the first weather information and the second weather information to determine combined weather information by:

determining, based on the first weather information, radar intensity information associated with a first weather product in a two-dimensional horizontal plane of a three-dimensional region of airspace;

determining, based on the second weather information, altitude data associated with a second weather product in the three-dimensional region of airspace;

determining that the first weather product is located in a same area of the three-dimensional region of airspace as the second weather product; and merging the first weather information for the first weather product with the second weather information of the second weather product.

16. The non-transitory computer-readable medium of claim 13, wherein the instructions, when executed by the processor, further cause the processor to, for the at least one voxel of the plurality of voxels of the three-dimensional buffer:

determine, based at least in part on the weather product, aircraft systems status information, and aircraft state data, a threat level for the respective voxel, and output, for display at the display device, a visual representation of the threat level for the respective voxel, wherein the combined reliability index indicates a calculated confidence of the threat level for the respective voxel.

17. The system of claim 8, wherein the first source comprises an onboard radar system of the aircraft.

18. The non-transitory computer-readable medium of claim 13, wherein the first source comprises an onboard radar system of the aircraft.

* * * * *